(12) United States Patent
Yamada

(10) Patent No.: US 6,368,441 B1
(45) Date of Patent: Apr. 9, 2002

(54) METHOD FOR MANUFACTURING OPTICAL FIBER ARRAY

(75) Inventor: Atsushi Yamada, Tokyo (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 0 days.

(21) Appl. No.: 09/420,009

(22) Filed: Oct. 18, 1999

(30) Foreign Application Priority Data

Oct. 20, 1998 (JP) .......................................... 10-316850
Sep. 21, 1999 (JP) .......................................... 10-267232

(51) Int. Cl.$^7$ ............................................. B32B 31/14
(52) U.S. Cl. .................... 156/178; 156/179; 156/273.3; 156/273.5; 156/275.7; 385/52
(58) Field of Search .................................. 156/178, 179, 156/273.3, 275.5, 275.7, 273.5, 307.3; 385/137, 52

(56) References Cited

U.S. PATENT DOCUMENTS

| 5,006,201 A | * | 4/1991 | Kaukeinen | .................... | 216/24 |
| 5,528,719 A | | 6/1996 | Yamada | | |
| 5,790,731 A | * | 8/1998 | Deveau | .................... | 385/49 |

FOREIGN PATENT DOCUMENTS

| EP | 0 514 722 A1 | 11/1992 |
| EP | 0 516 337 A2 | 12/1992 |
| JP | 60-214310 | 10/1985 |
| JP | 6-11625 | 1/1994 |
| JP | 62-81823 | 10/1994 |
| JP | 2-168047 | 7/1995 |

* cited by examiner

Primary Examiner—Jeff H. Aftergut
Assistant Examiner—Todd J. Kilkenny
(74) Attorney, Agent, or Firm—Armstrong, Westerman & Hattori, LLP

(57) ABSTRACT

A method for manufacturing an optical fiber array by connecting bare fibers to connection elements in a facing arrangement, comprising a step of aligning a plurality of bare fibers using a bare-fiber guide; a step of bringing a flat member into contact with the aligned bare fibers, tacking the bare fibers onto the flat member by direct or indirect bonding means while keeping the bare fibers sandwiched between the bare-fiber guide and the flat member, and separating the bare fibers and the bare-fiber guide thereafter; and a step of forming a coating of uncured material on the external peripheral surfaces of the tacked bare fibers and on the flat member exposed between the bare fibers, curing this material, and bonding the bare fibers to the flat member. This method dispenses with the need to provide a bare fiber guide member and allows manufacturing costs to be reduced.

14 Claims, 23 Drawing Sheets

METHOD FOR MANUFACTURING OPTICAL FIBER ARRAY

BACKGROUND OF THE INVENTION

1. Field of the Invention

The present invention relates to a method for manufacturing an optical fiber array that comprises a plurality of bare fibers aligned and held at specific intervals and that facilitates the optical and mechanical coupling of the bare fibers and connection elements (for example, optical fiber lines, optical waveguides, optical elements, and other components on optical circuit boards) in a facing arrangement therewith, and more particularly to a method for manufacturing an optical fiber array aimed at eliminating the need to provide bare fiber guide members and reducing manufacturing costs without lowering the accuracy of the alignment intervals between the bare fibers.

2. Description of the Related Art

With such optical fiber arrays, the alignment intervals between the bare fibers can be set with high accuracy, and positional matching and optical coupling can be facilitated in relation to the optical fiber lines, optical waveguides, and the like on optical circuit boards arranged at corresponding alignment intervals.

Bare fiber guide members for accurately setting the alignment intervals between bare fibers are provided to conventional optical fiber arrays as the structural members of these optical fiber arrays. In conventional practice, the V-groove member a depicted in FIG. 25A, the capillary member b depicted in FIG. 26, and the like are known as such bare fiber guide members.

Specifically, the aforementioned V-groove member a is configured such that a plurality of grooves with generally V-shaped cross sections (V grooves) a1 are formed lengthwise on one of the surfaces thereof.

Bare fibers c are placed in the V grooves a1 of the aforementioned V-groove member a. The bare fibers c are secured in place by the two lateral inclined planes of the V grooves a1, and the fixing positions of these bare fibers c are set, by downward pressure from a presser plate d, as shown in FIG. 25B.

A plurality of bare fibers c can be aligned at regular intervals by forming a plurality of identically sized V grooves a1 at regular intervals. An optical fiber array e configured as shown in FIG. 25C is obtained by filling the gaps between the aforementioned bare fibers c (exposed fibers stripped of their outer envelopes, that is, fibers comprising a core and a cladding, are referred to as "bare fibers"; in a narrow sense, this term applies to exposed sections obtained by the stripping of the outer envelope from the area near the tip of a fiber ribbon), the V-groove member a, and the presser plate d with an adhesive and allowing this adhesive to solidify.

A capillary member b, on the other hand, is provided with a plurality of long and narrow holes b1 whose inside diameter is slightly greater (commonly about 1–2 $\mu$m) than the outer contours of the bare fibers, as shown in FIG. 26. The fixing positions of the bare fibers are approximately set by inserting the bare fibers into the holes b1. The gaps between the bare fibers and the holes b1 are filled with an adhesive. The surface tension of this adhesive has an action whereby the bare fibers tend to be disposed roughly in the centers of the holes b1, and the bare fibers are fixed in the capillary member b by allowing the filled-in adhesive to solidify. The bare fibers and the wall surfaces of the holes b1 in the capillary member b are not necessarily in contact with each other due to the presence of the aforementioned adhesive, but because the surface tension of the filled-in adhesive has an action whereby the bare fibers tend to be disposed roughly in the centers of the holes b1 in the above-described manner, it is the wall surfaces of the holes b1 that set the fixing positions of the bare fibers. Consequently, a plurality of bare fibers can be aligned at regular intervals by forming a plurality of holes b1 whose centers are spaced at regular intervals.

It should be noted that the above-described V-groove member a, capillary member b, and other bare fiber guide members incur high manufacturing costs because these bare fiber guide members require high dimensional accuracy (commonly 1 $\mu$m or less). Another drawback is that conventional optical fiber arrays are provided with the above-described bare fiber guide members as the structural members thereof, so the cost of such optical fiber arrays is proportionally higher.

To overcome this shortcoming, a method (see Japanese Unexamined Patent Application, (Japanese Patent Laid-Open No.07-168047) has been developed in which two tabular members f1 and f2 (see FIG. 27) with generally L-shaped cross sections are used instead of the above-described V-groove member a, capillary member b, or the like; bare fibers c are confined between these tabular members f1 and f2; and these bare fibers c are confined using an L-shaped ferrule with a generally L-shaped cross section and two flat plates parallel to two planes of this L-shaped ferrule.

This and other methods are disadvantageous, however, in that the alignment intervals between bare fibers cannot be set freely because these alignment intervals are determined by the diameters of the bare fibers. Another disadvantage is that when the diameters of the bare fibers vary as a result of dimensional nonuniformities, these nonuniformities accumulate and ultimately bring about marked variations in the fixing positions of the bare fibers in the areas near the two ends, making these methods unsuitable for reducing manufacturing costs without lowering the accuracy of the alignment intervals between the bare fibers.

By contrast, the bare fibers of optical fiber arrays provided with V-groove members a, capillary members b, and other bare fiber guide members are fixed individually, preventing the errors in the fixing positions from accumulating across a plurality of bare fibers.

A drawback, therefore, is that it is currently indispensable that the above-described V-groove members a, capillary members b, or other bare fiber guide members be provided in order to accurately set the alignment intervals between bare fibers, perpetuating the situation that prevents production of lower-cost optical fiber arrays.

With this technical background in view, a method for manufacturing an optical fiber array in which bare fibers can be aligned with high accuracy without the use of expensive bare fiber guide members has recently been proposed (see Japanese Patent Laid-Open No.06-11625).

Specifically, this manufacturing method entails installing a fiber-ribbon guide g, which is provided with a plurality of V grooves formed at an equal pitch in the upper surface thereof in the manner shown in FIG. 28A; a bare-fiber guide h (see FIG. 29), which is provided with a plurality of V grooves formed in the upper surface thereof; and a presser i, which is provided with trapezoid projections that fit into the V grooves of the aforementioned fiber-ribbon guide g. The tip portions of fiber ribbons k (exposed sections obtained by stripping away the jackets j1 of fiber optic cables j, that is, sections covered by ribbon material k1, are referred to as "fiber ribbons") are inserted into the V grooves of the aforementioned fiber-ribbon guide g to support these fiber ribbons k in a parallel formation; the tip portions of bare fibers m (in a narrow sense, "bare fibers" refers to exposed sections obtained by stripping the ribbon material k1 from the fiber ribbons k) are inserted into the V grooves of the aforementioned bare-fiber guide h to support the bare fibers m in a parallel formation; the aforementioned presser i is placed on the bare-fiber guide h to prevent the bare fibers m from shifting upward; and the external peripheral surfaces of the bare fibers m and fiber ribbons k are coated with an adhesive n.

According to this method, a bottom plate r (see FIG. 30) is then set such that a flat surface p is disposed underneath the bare fibers m in the manner shown in FIG. 28B and that an angular groove q is disposed underneath the fiber ribbons k; a top plate s (see FIG. 30) is set such that a flat surface p is disposed above the aforementioned bare fibers m and that an angular groove q is disposed above the fiber ribbons k; the aforementioned bare fibers m are sandwiched between the top plate s and the bottom plate r; the aforementioned adhesive n is allowed to harden in this state to bond the top plate s and the bottom plate r together; and the adhesive n and bare fibers m extending from the integrated top plate s and bottom plate r are removed, yielding an optical fiber array t such as that shown in FIG. 28C.

With this manufacturing method, the aforementioned bare fibers m are aligned with the aid of a fiber-ribbon guide g, a bare-fiber guide h, and a presser i, and the completed optical fiber array t is devoid of bare fiber guide members, making it possible to markedly lower the manufacturing costs of such optical fiber arrays.

This manufacturing method is disadvantageous, however, in that the bare fibers m cannot be accurately aligned for the reasons described below, and is thus similar to the method described in Japanese Patent Laid-Open No.07-168047 in its inability to serve as a method in which manufacturing costs can be lowered without reducing the accuracy of the alignment intervals between the bare fibers.

Specifically, it is possible to align with high accuracy the positions of the bare fibers m sandwiched between the bare-fiber guide h and the presser i in the manner shown in FIG. 28A (as shown in FIG. 28B, these positions correspond to the sections of the bare fibers m that extend from the integrated top plate s and bottom plate r, and are not incorporated into the optical fiber array because of being removed together with the exposed adhesive in the manner described above), but the bare fibers m gradually lose their tension in the direction from the bare-fiber guide h toward the fiber-ribbon guide g, making it difficult to align the bare fibers m at these positions with high accuracy. Applying tension to the bare fibers m between the fiber-ribbon guide g and the bare-fiber guide h has been suggested as a method for preventing the loosening of the bare fibers m, but this approach is disadvantageous in that it causes breakage of the bare fibers m.

In addition, applying the adhesive n to external peripheral surfaces of the aforementioned bare fibers m as shown in FIG. 28A causes the bare fibers m to move closer to each other as a result of the surface tension of the adhesive n, and when the top plate s or the bottom plate r is brought into contact from above or below with the bare fibers m coated with the adhesive n in the manner shown in FIG. 28B, the bare fibers m and the top plate s or the bottom plate r are brought closer to each other by the surface tension of the adhesive n. These phenomena cause the interval between the bare fibers m to vary, making accurate alignment of the bare fibers m difficult to achieve.

Furthermore, bringing the top plate s or the bottom plate r into contact from above or below with the bare fibers m coated with the adhesive n causes the bare fibers m to shift their positions by about 1 µm due to slight differences in contact pressure on the bare fibers m between the top plate s and the bottom plate r, making accurate alignment of the bare fibers m difficult to achieve.

For these reasons, the method for manufacturing optical fiber arrays described in Japanese Patent Laid-Open No.06-11625 is disadvantageous in its inability to ensure accurate alignment of bare fibers m.

SUMMARY OF THE INVENTION

An object of the present invention, which was perfected in view of the above-described situation, is to provide a method for manufacturing an optical fiber array in which the alignment interval between the bare fibers can be set with high accuracy without the need to provide a bare fiber guide member.

Another object of the present invention is to provide a method for manufacturing an optical fiber array in which the alignment positions of the bare fibers do not change during the manufacturing step.

Yet another object of the present invention is to provide a method for manufacturing an optical fiber array in which the need to provide a bare fiber guide member is dispensed with and the manufacturing costs are markedly reduced.

Still another object of the present invention is to provide a method for manufacturing an optical fiber array whereby an optical fiber array whose bare fibers have high alignment density can be manufactured in a simple manner.

Specifically, the first manufacturing method of the present invention is a method for manufacturing an optical fiber array by providing a plurality of bare fibers aligned and held at specific intervals, and connecting these bare fibers to connection elements in a facing arrangement, comprising a step of aligning a plurality of bare fibers using a bare-fiber guide provided with a plurality of guide grooves formed in the longitudinal direction at specific intervals; a step of bringing the flat surface of an array body into contact with the bare fibers aligned by means of the bare-fiber guide, tacking the bare fibers onto the flat surface of the array body by direct or indirect bonding means while keeping the bare fibers sandwiched between the bare-fiber guide and the flat surface of the array body, and separating the bare fibers and the bare-fiber guide thereafter; and a step of forming a coating of uncured material on the external peripheral surfaces of the bare fibers tacked onto the flat surface of the array body and on the flat surface of the array body exposed between the bare fibers, curing this material, and bonding the bare fibers to the flat surface of the array body.

Furthermore, the second manufacturing method of the present invention is a method for manufacturing an optical fiber array by providing a plurality of bare fibers aligned and held at specific intervals, and connecting the bare fibers to connection elements in a facing arrangement, comprising a step of aligning a plurality of bare fibers using a bare-fiber guide provided with a plurality of guide grooves formed in the longitudinal direction at specific intervals; a step of bringing the flat surface of an array body or the flat member into contact with the bare fibers aligned by means of the bare-fiber guide, tacking the bare fibers onto the flat surface of the array body or the flat member by direct or indirect bonding means while keeping the bare fibers sandwiched between the bare-fiber guide and the flat surface of the array body or the flat member, and separating the bare fibers and the bare-fiber guide thereafter; a step of forming a coating of uncured material on the external peripheral surfaces of the bare fibers tacked onto the flat surface of the array body or the flat member and on the flat surface of the array body or the flat member exposed between the bare fibers, curing this material, and bonding the bare fibers to the flat surface of the array body or the flat member; and a step of superposing a flat member or the flat surface of an array body through the agency of an uncured material on the bare fibers bonded to the flat surface of the array body or the flat member, curing the material, and monolithically bonding the flat member and the flat surface of the array body.

Moreover, the third manufacturing method of the present invention is a method for manufacturing an optical fiber array by providing a plurality of bare fibers aligned and held at specific intervals, and connecting the bare fibers to connection elements in a facing arrangement, comprising a step of aligning a plurality of first bare fibers using a bare-fiber guide provided with a plurality of guide grooves formed in the longitudinal direction at specific intervals; a step of bringing the flat surface of a first array body into contact with the first bare fibers aligned by means of the bare-fiber guide, tacking the first bare fibers onto the flat surface of the first array body by direct or indirect bonding means while keeping the first bare fibers sandwiched between the bare-fiber guide and the flat surface of the first array body, and separating the first bare fibers and the bare-fiber guide thereafter; a step of forming a coating of uncured material on the external peripheral surfaces of the first bare fibers tacked onto the flat surface of the first array body and on the flat surface of the first array body exposed between the first bare fibers, curing this material, and bonding the first bare fibers to the flat surface of the first array body; a step of aligning a plurality of second bare fibers using the aforementioned bare-fiber guide or another bare-fiber guide of the same structure; a step of bringing the flat surface of a second array body into contact with the second bare fibers aligned by means of the bare-fiber guide, tacking the second bare fibers onto the flat surface of the second array body by direct or indirect bonding means while keeping the second bare fibers sandwiched between the bare-fiber guide and the flat surface of the second array body, and separating the second bare fibers and the bare-fiber guide thereafter; a step of forming a coating of uncured material on the external peripheral surfaces of the second bare fibers tacked onto the flat surface of the second array body and on the flat surface of the second array body exposed between the second bare fibers, curing this material, and bonding the second bare fibers to the flat surface of the second array body; and a step of superposing the first array body and the second array body through the agency of the uncured material such that the first bare fibers are disposed in central positions between the second bare fibers in the second array body and that the second bare fibers are disposed in central positions between the first bare fibers in the first array body, curing the material, and monolithically bonding the first array body and the second array body.

DESCRIPTION OF THE PREFERRED EMBODIMENTS

The present invention will now be described in detail.

First Embodiment

Figure 1:
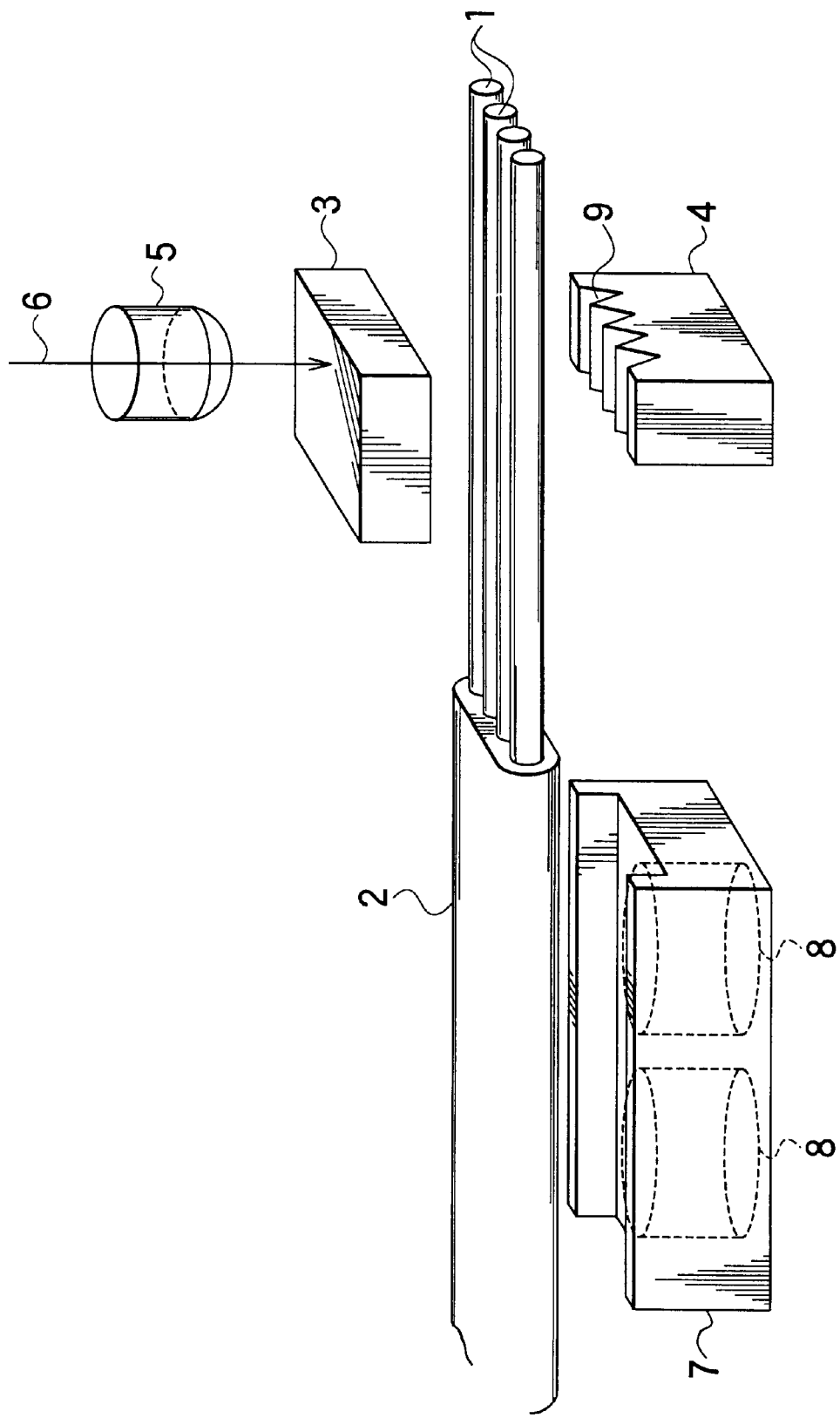
FIG. 1 is a schematic perspective view of the apparatus and structural members used in the implementation of the method for manufacturing an optical fiber array in accordance with a First Embodiment.

In FIG. 1, which depicts the apparatus and structural members used in the implementation of the method for manufacturing an optical fiber array in accordance with the present invention, 1 is a bare fiber, 2 is a fiber ribbon, 3 is a flat member, 4 is a bare-fiber guide, 5 is a transparent pressure means, 6 is UV light or another type of actinic radiation, and 7 is a fiber-ribbon attachment block equipped with a suction port 8.

The bare-fiber guide 4 is composed of a ceramic or other material that can be machined with high precision, and is provided on one side thereof with a plurality of (four) guide grooves (V grooves) 9 that extend lengthwise.

Figure 2:
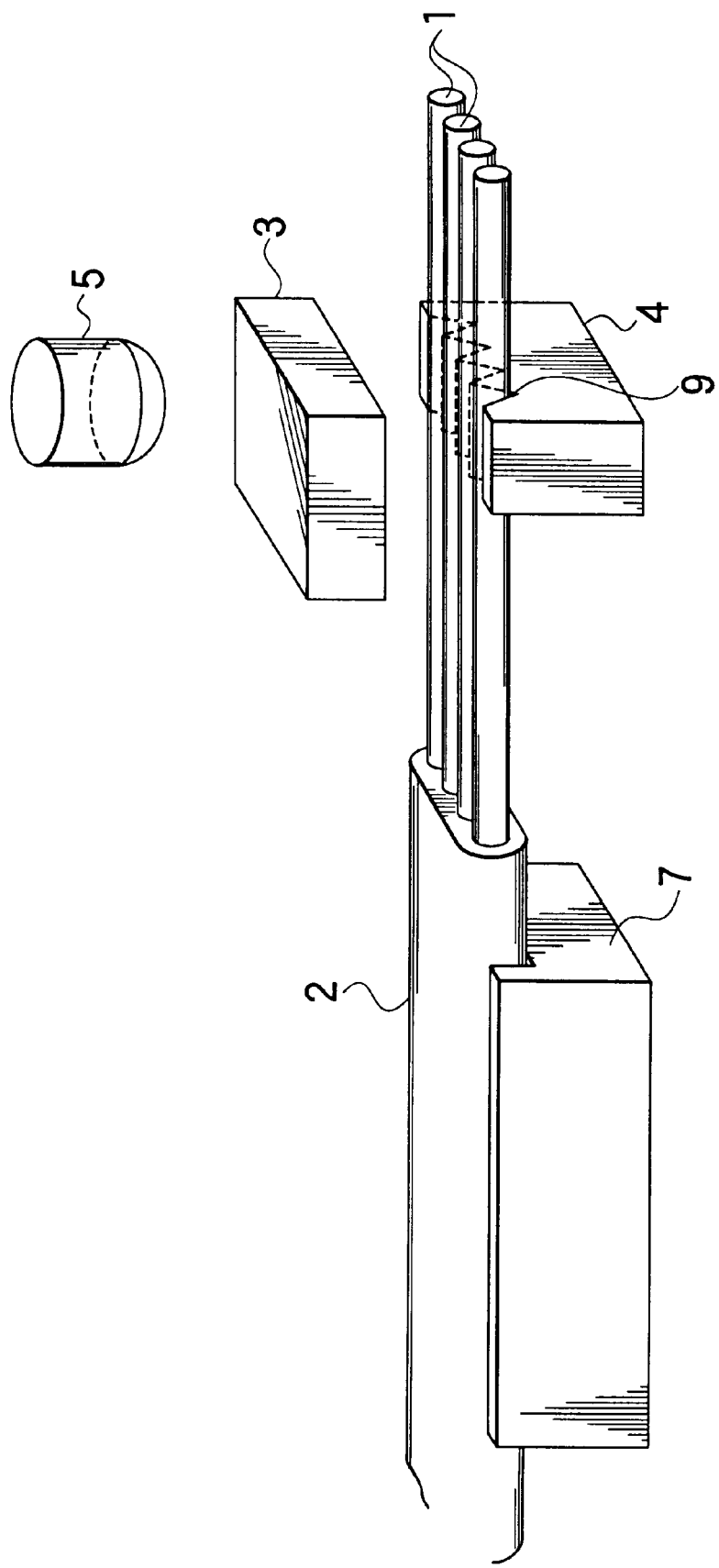
FIG. 2 is a schematic perspective view depicting the steps for manufacturing an optical fiber array in accordance with the First Embodiment.
Figure 13A:
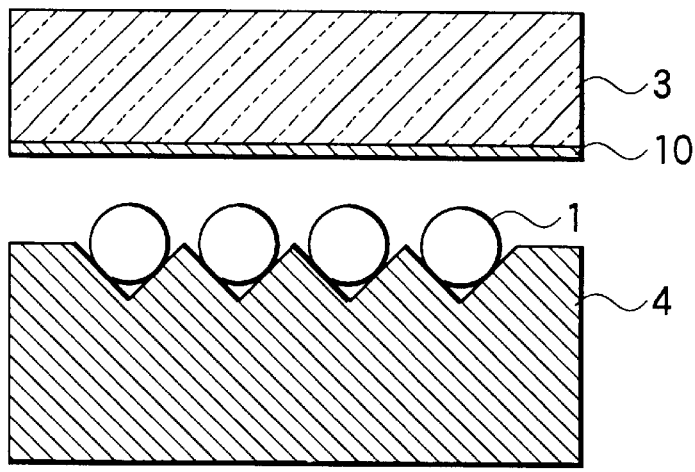
FIGS. 13A to 13C are diagrams illustrating the steps for manufacturing an optical fiber array In accordance with the First Embodiment.

First, the fiber ribbon 2 is placed on the fiber-ribbon attachment block 7 as shown in FIG. 2, and the aforementioned bare fibers 1 are placed in the guide grooves (V grooves) 9 of the bare-fiber guide 4. In this Embodiment, a means for tacking the bare fibers 1 onto the aforementioned flat member 3 using an indirect bonding means is adopted, so an adhesive layer 10 (see FIG. 13A) is formed from a silica sol, low-melting glass, a resin material cured by actinic radiation (UV light, visible light, infrared light, electron beams, etc.), or the like on the face of the aforementioned flat member 3 or on the external peripheral surfaces of the bare fibers 1. The adhesive layer composed of a resin material, silica sol, or the like may, for example, be formed by a method in which a fluid resin material, silica sol, or other material is applied by spraying; a method in which the material is applied in drops, and excess material is then removed by rotation; a method in which the material is applied in drops, and excess material is then removed by gas jetting; a method in which the material is applied with a brush, sponge, or the like; or a method in which the substrate is immersed in a silica sol or a liquid resin material, and is then slowly pulled up. Examples of formation methods involving low-melting-point glass include vapor deposition, sputtering, CVD, and other types of gas-phase deposition. It is also possible to employ methods in which a solution containing a low-melting-point glass composition is applied by the same formation method as that used with the aforementioned materials, and the solvents and reaction products are then removed by drying and baking, yielding a solid layer of low-melting-point glass. When a resin material is used for the adhesive layer 10, a filler selected from glass fibers, glass powder, carbon fibers, and mineral powder should preferably be added to the aforementioned resin material to reduce the difference in the coefficient of thermal expansion between the bare fibers and the flat member or the array body, and to control the shrinking of the resin material during curing. The aforementioned filler should preferably have a very small size (1 $\mu$m or less). This is because when the filler size exceeds 1 $\mu$m, the filler sometimes finds its way between the bare fibers 1 and the flat member 3, adversely affecting the alignment accuracy of the bare fibers 1. The face of the flat member covered with an adhesive layer of resin material, silica sol, or the like should preferably be roughened (to an arithmetic mean roughness Ra of 0.2 $\mu$m or greater) in order to increase the adhesive strength between the flat member and the resin material, silica sol, or the like.

Figure 3:
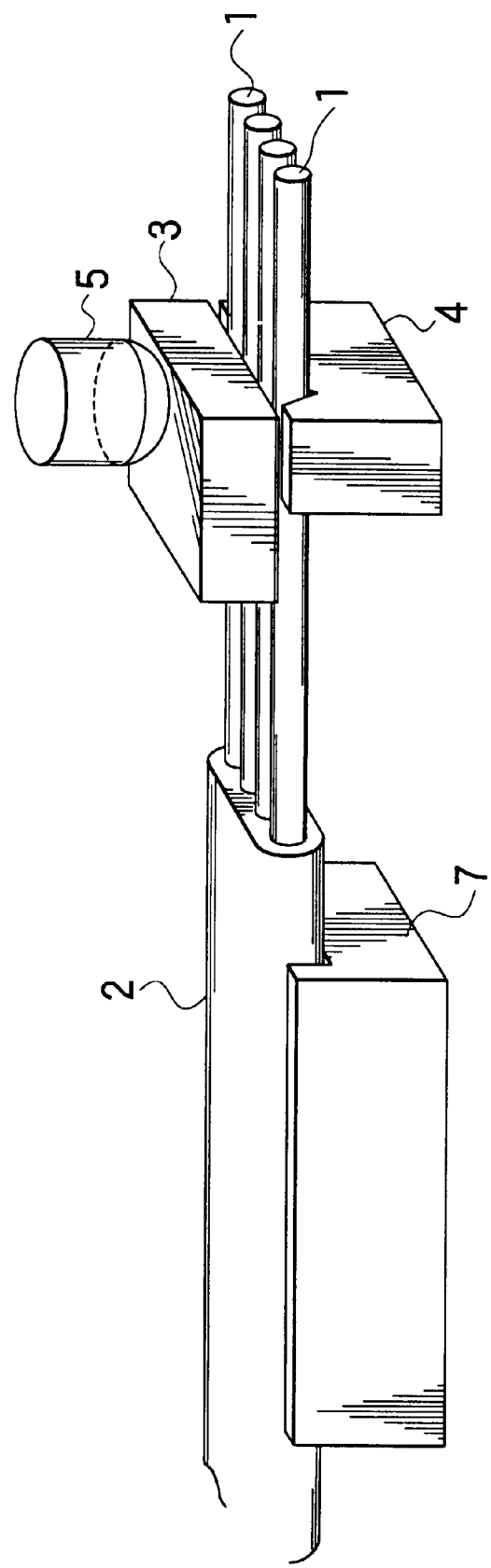
FIG. 3 is a schematic perspective view depicting the steps for manufacturing an optical fiber array in accordance with the First Embodiment.
Figure 13B:
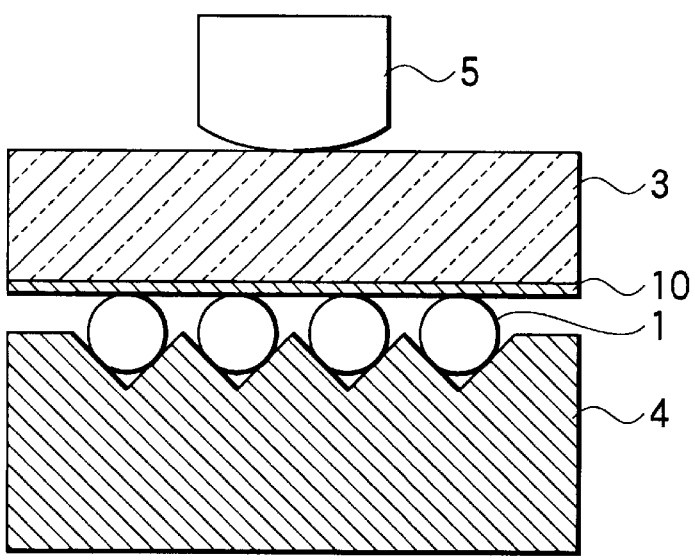
Figure 13C:
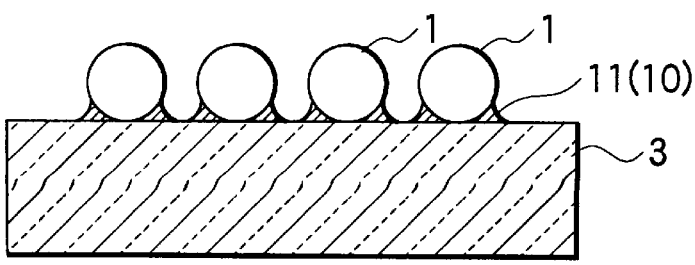

Next, as shown in FIGS. 3 and 13B, the flat member 3 provided with the adhesive layer 10 is brought into contact with the bare fibers 1 aligned by means of the aforementioned bare-fiber guide 4, pressure is applied by the transparent pressure means 5 to the back surface of the flat member 3, the bare fibers 1 are tacked onto the aforementioned flat member 3 by an indirect bonding means while sandwiched between the bare-fiber guide 4 and the flat member 3, and the bare fibers 1 and the bare-fiber guide 4 are then separated. When a resin material cured by actinic radiation (indirect bonding means) is used, this resin material is exposed to the actinic radiation while the bare fibers 1 are sandwiched between the bare-fiber guide 4 and the flat member 3. Another feature is that while the bare fibers 1 are sandwiched between the bare-fiber guide 4 and the flat member 3, the resin material, silica sol, or other liquid material constituting the aforementioned adhesive layer 10 is squeezed by the pressure of the bare fibers 1 and is caused to flow along the lateral surfaces of the bare fibers 1 and to form beads of liquid adhesive along the lateral surfaces of the bare fibers 1. These beads solidify to form tacking/reinforcing sections 11 such as those shown in FIG. 13C.

When a silica sol, a resin material curable by actinic radiation, or the like is subsequently allowed to fall in drops on the bare fibers 1 extending toward the tip portion from the flat member 3 in the manner shown in FIG. 4, the material flows across the surfaces of the bare fibers 1 and covers the surface of the flat member 3 to which the bare fibers 1 are tacked. The method for applying these materials is not limited to the above-described technique, and any application method may be used. When a silica sol is used as such a material, an exhaust opening (component 12, indicated by a chain line) should preferably be provided in advance to the flat member 3 in the manner shown in FIG. 4 in order to allow solvents and the like to escape with greater ease during gelation. When a resin material curable by actinic radiation is used as such a material, a filler selected from glass fibers, glass powder, carbon fibers, and mineral powder should preferably be added to the aforementioned resin material to reduce the difference in the coefficient of thermal expansion between the bare fibers and the flat member or the array body, and to control the shrinking of the resin material during curing.

Figure 14A:
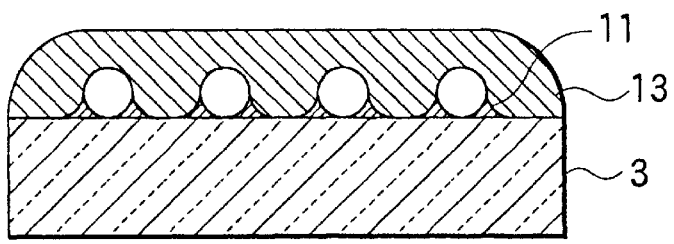
FIGS. 14A and 14B are diagrams illustrating the steps for manufacturing an optical fiber array in accordance with the First Embodiment.
Figure 15A:
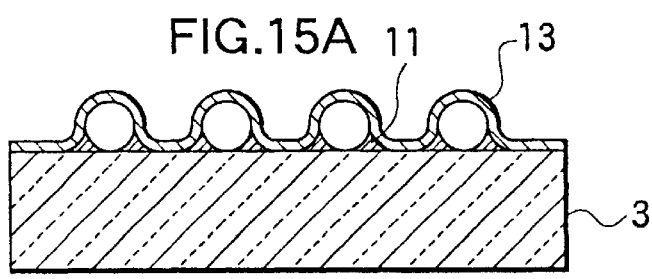
FIGS. 15A and 15B are diagrams illustrating the steps for manufacturing an optical fiber array In accordance with the First Embodiment.

A thick cured layer 13 forms on the surface of the flat member 3 to which the bare fibers 1 are tacked (as shown in FIG. 14A) when a large amount of silica sol, resin material, or the like is fed to fill in the gaps, and a thin cured layer 13 forms on the surface of the flat member 3 to which the bare fibers 1 are tacked (as shown in FIG. 15A) when only a small amount of material is fed. The alignment positions of the bonded bare fibers 1 do not change during subsequent treatments because the bare fibers 1 tacked onto the flat member 3 are securely bonded to the flat member 3 by the aforementioned cured layer 13.

Figure 4:
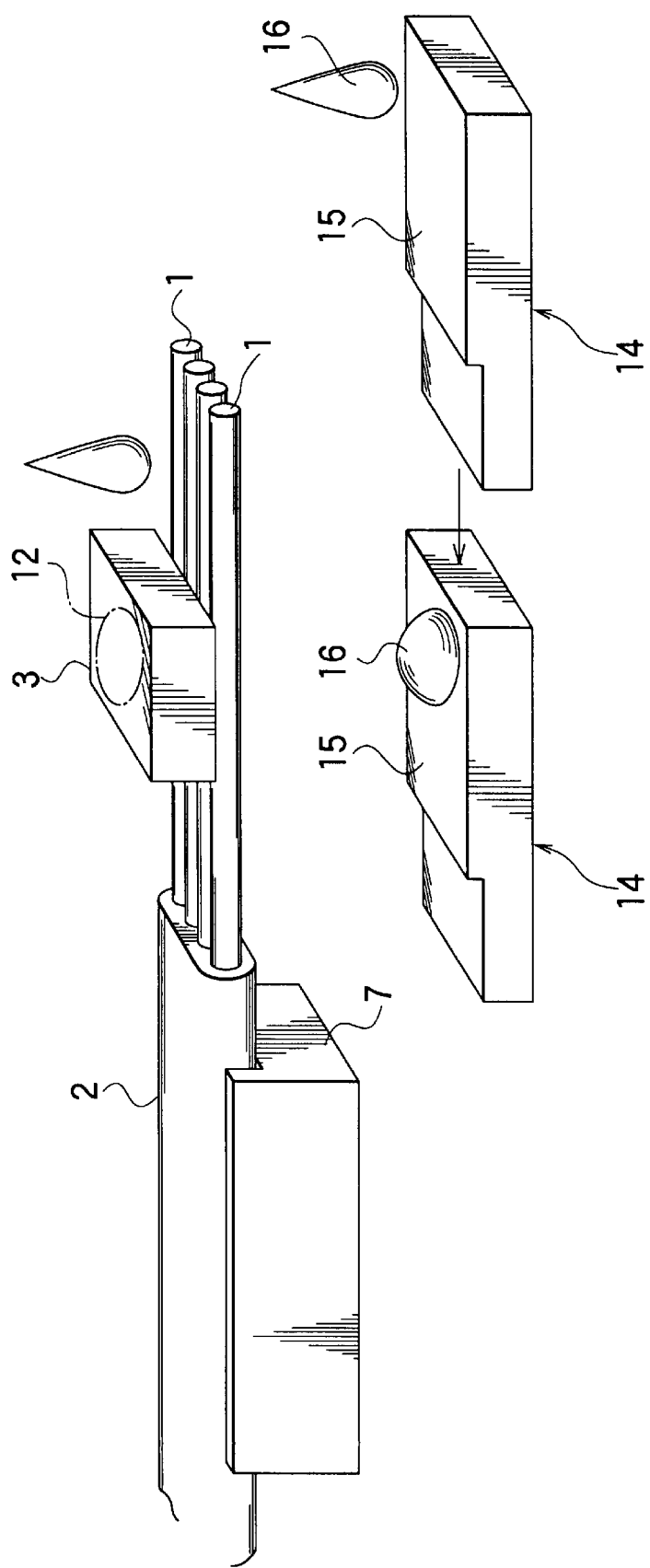
FIG. 4 is a schematic perspective view depicting the steps for manufacturing an optical fiber array in accordance with the First Embodiment.
Figure 5:
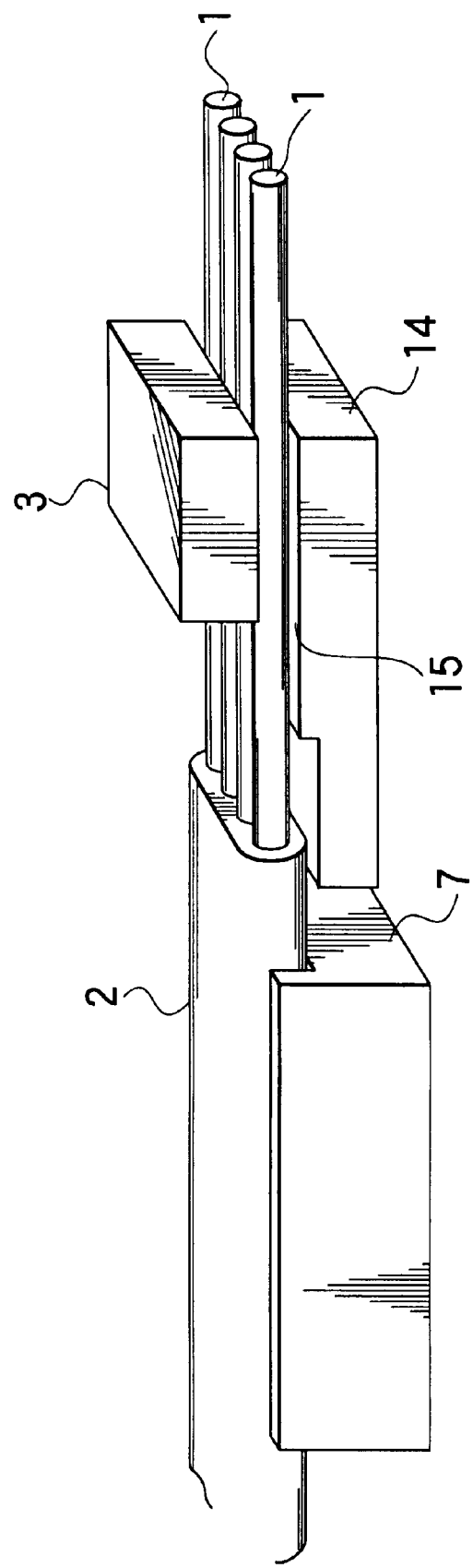
FIG. 5 is a schematic perspective view depicting the steps for manufacturing an optical fiber array in accordance with the First Embodiment.

A silica sol, a resin material curable by actinic radiation, or another uncured material 16 is fed to the flat surface 15 of an array body 14 by an appropriate method in the manner shown in FIG. 4, the flat surface 15 of this array body 14 is superposed on the bare fibers 1 bonded to the aforementioned flat member 3 in the manner shown in FIG. 5, the aforementioned uncured material 16 is allowed to cure and to form a cured body 17, and the flat member 3 and the flat surface 15 of the array body 14 are monolithically joined together. The portions of the bare fibers 1 projecting outward beyond the tips of the monolithically joined flat member 3 and the flat surface 15 of the array body 14 are removed, and the optical fiber array (see FIGS. 14B and 15B) pertaining to this Embodiment is thus completed.

Figure 16A:
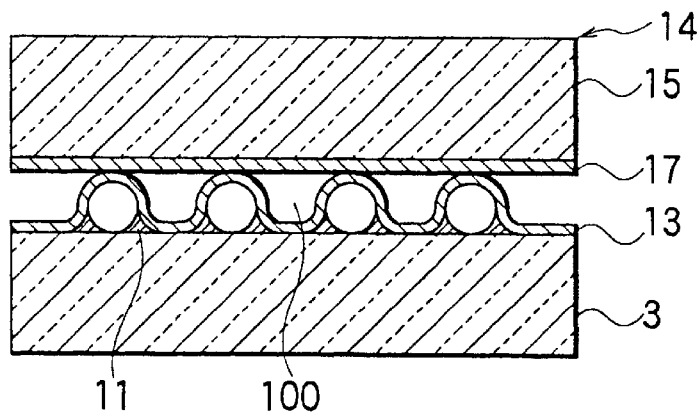
FIGS. 16A and 16B are diagrams illustrating the steps for manufacturing an optical fiber array in accordance with the First Embodiment.
Figure 16B:
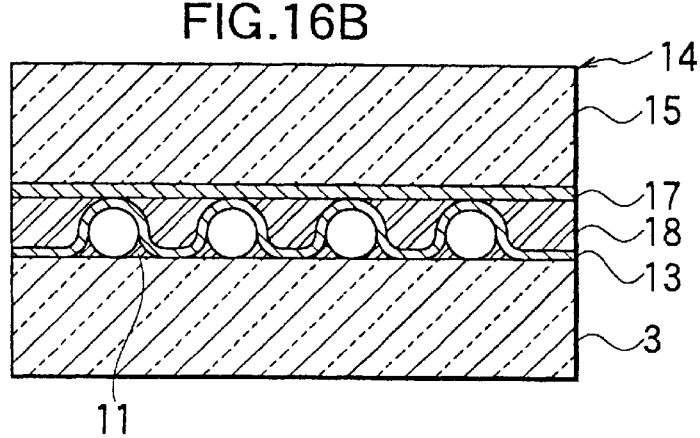
Figure 17A:
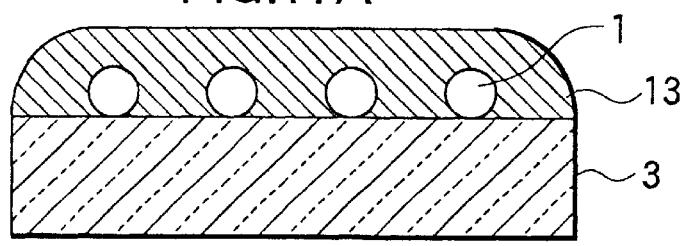
FIGS. 17A and 17B are diagrams illustrating the steps for manufacturing an optical fiber array according to a modification of the First Embodiment.
Figure 17B:
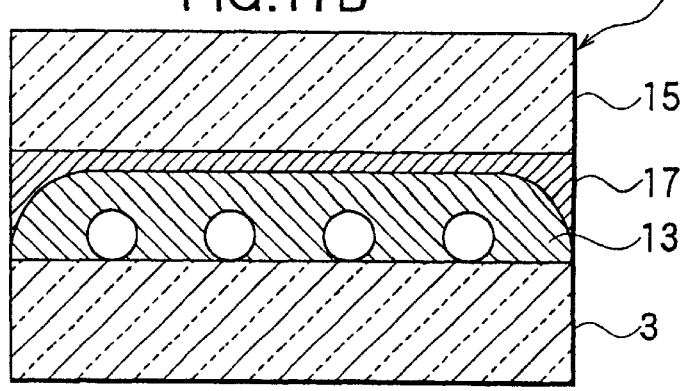
Figure 18A:
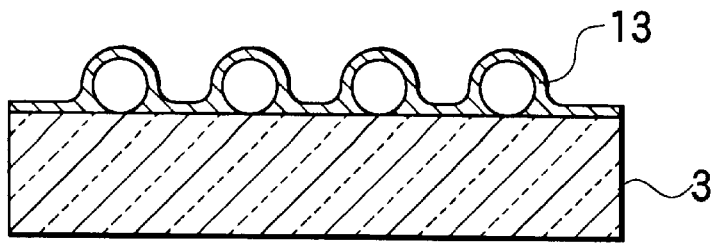
FIGS. 18A and 18B are diagrams illustrating the steps for manufacturing an optical fiber array according to a modification of the First Embodiment.
Figure 18B:
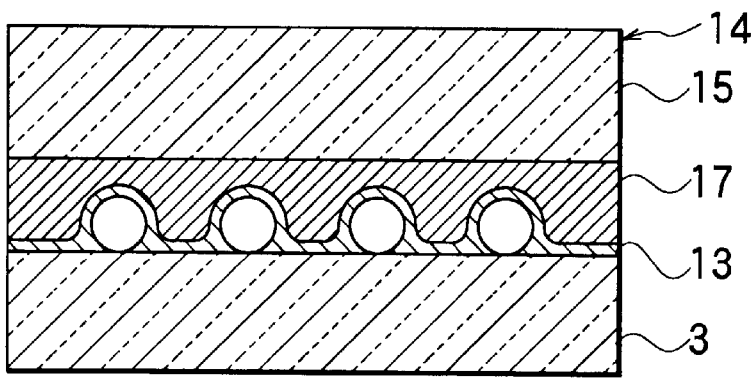

Cavities 100 such as those shown in FIG. 16A are formed between the flat member 3 and the flat surface 15 of the array body 14 in the optical fiber array obtained when the aforementioned cured layer 13 and cured body 17 are thin articles. A structure having such cavities 100 can be obtained, as a structure in which the aforementioned cavities 100 are filled with a silica sol or a resin material 18 curable by actinic radiation, as shown in FIG. 16B.

An indirect bonding means was used in this Embodiment as a technique for tacking the bare fibers 1 onto the aforementioned flat member 3, but direct bonding means may also be used. Examples of such means include anodic bonding, whereby voltage is applied between a flat member 3 and bare fibers 1, and these components are joined together without the use of the above-described silica sols, resin materials, or other adhesives; and diffusion or fusion bonding, whereby the flat member 3 and the bare fibers 1 are heated and joined together.

Figure 6:
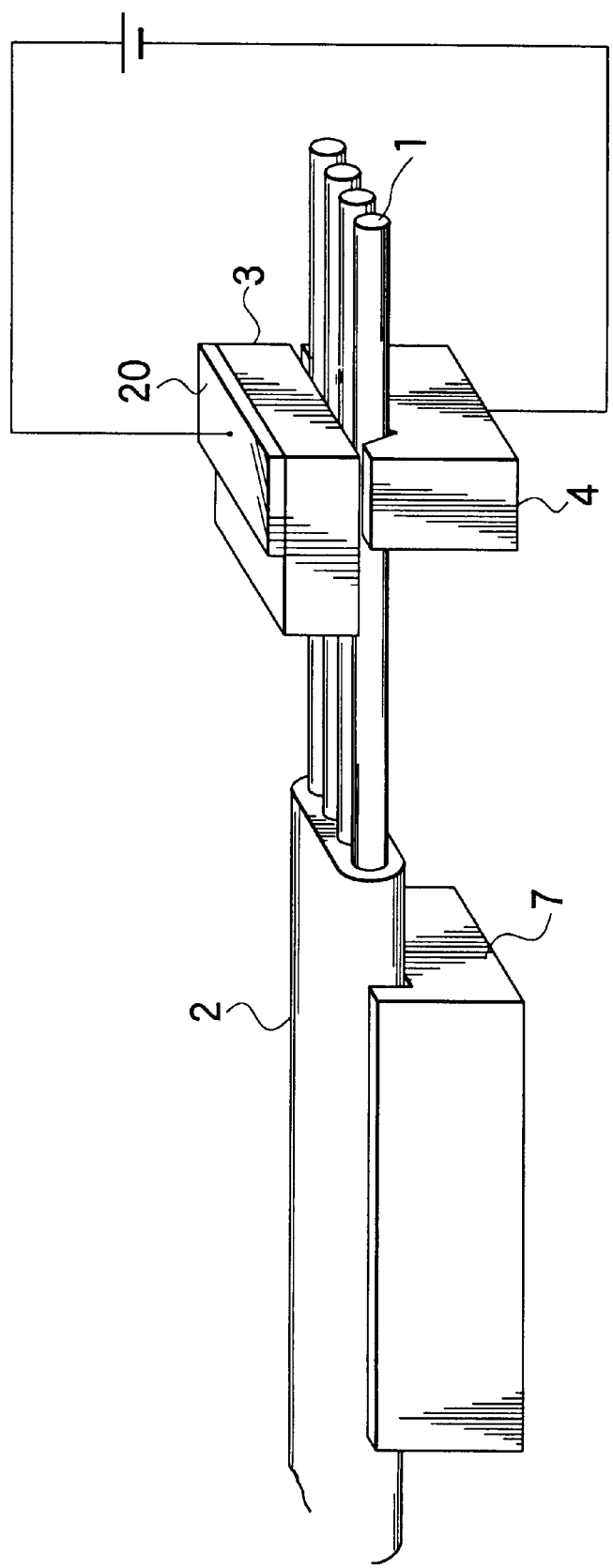
FIG. 6 is a schematic perspective view depicting the steps for manufacturing an optical fiber array according to a modification of the First Embodiment.

FIG. 6 is a perspective view depicting an anodic bonding method.

Specifically, a flat member 3 and bare fibers 1 are brought into contact with each other without the use of a silica sol, resin material, or other adhesive material; an electrode 20 is placed on the back surface of the flat member 3, and voltage is applied between the aforementioned electrode 20 and a bare-fiber guide 4, the bare-fiber guide 4 being composed of tungsten or another electroconductive material. The bare fibers 1 are tacked onto the aforementioned flat member 3 as a result of such a treatment.

FIGS. 17A, 17B, 18A, and 18B are cross sections depicting optical fiber arrays obtained by adopting direct bonding means.

These means yield structures in which the lateral surfaces of the bare fibers 1 are devoid of the tacking/reinforcing sections 11 (see FIG. 13C) because no silica sol, resin material, or other adhesive material is used for these optical fiber arrays.

Glass, ceramics, low-expansion metals, or the like may be used for the array body 14 or flat member 3, which is part of an optical fiber array. In this Embodiment, the array body 14 provided with a flat surface 15 is composed of a single member (as shown in FIG. 4), but it is also possible to use a structure composed of a plurality of members obtained by laminating a separate flat-surface plate (designed for forming the flat surface 15) to a rectangular plate composed of glass, ceramic, or the like.

Another feature of the optical fiber array pertaining to this Embodiment is that although the structure obtained is one in which the bare fibers are connected on only one side to optical fiber lines or other connection elements (as shown in FIG. 5), it is also possible to use a structure in which both sides of the bare fibers are connected to the connection elements, as is the case with optical fiber arrays for connecting blocks.

Figure 7A:
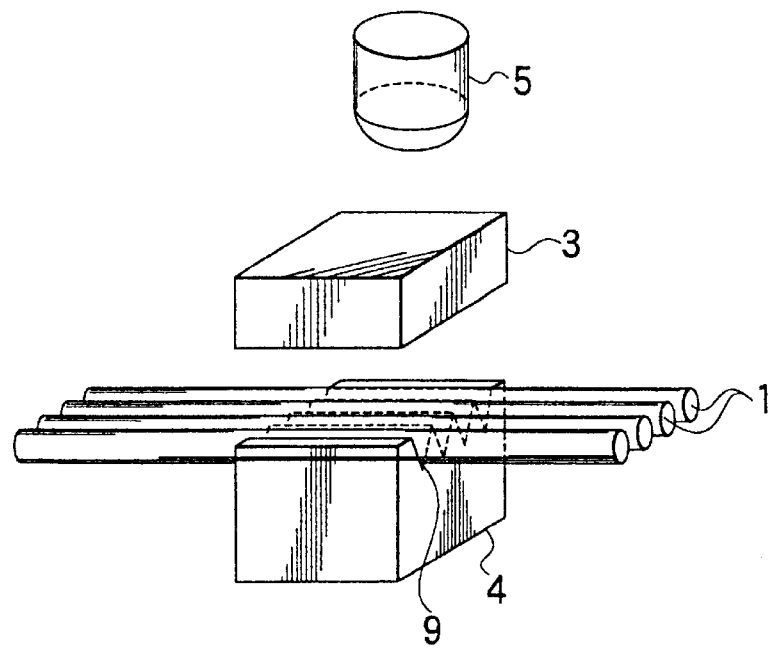
FIGS. 7A to 7C are schematic perspective views depicting the steps for manufacturing an optical fiber array for connecting blocks according to a modification of the First Embodiment.
Figure 7B:
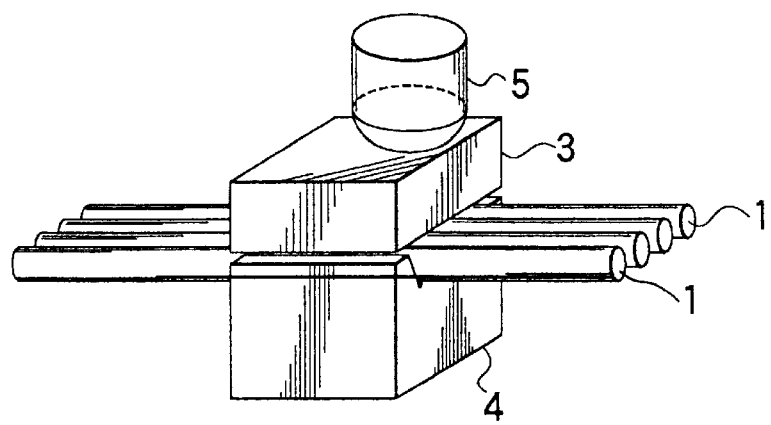
Figure 7C:
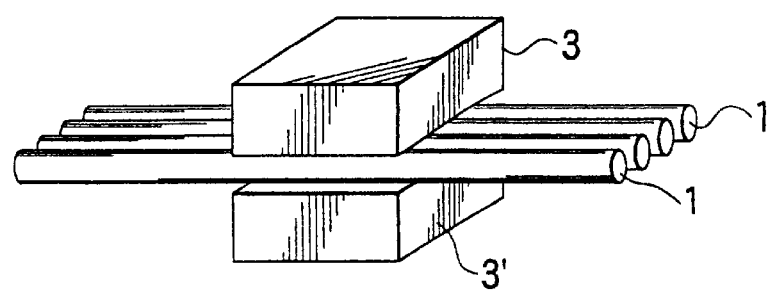

FIGS. 7A to 7C depict the steps for manufacturing such an optical fiber array for connecting blocks.

Specifically, four mutually separated bare fibers 1 (bare fibers devoid of their outer envelopes and composed of a core and a cladding) are placed and aligned in the guide grooves (V grooves) 9 of a bare-fiber guide 4, as shown in FIG. 7A.

A first flat member 3 provided with an adhesive layer is subsequently brought into contact with the bare fibers 1 aligned with the aid of the aforementioned bare-fiber guide 4 in the manner shown in FIG. 7B, pressure is applied with a transparent pressure means 5 to the back surface of the first flat member 3, the bare fibers 1 are tacked onto the aforementioned first flat member 3 by an indirect bonding means while the bare fibers 1 are sandwiched between the bare-fiber guide 4 and the first flat member 3, and the bare fibers 1 and the bare-fiber guide 4 are then separated.

When a silica sol, a resin material curable by actinic radiation, or the like is subsequently allowed to fall in drops on one side of the bare fibers 1 projecting outward from the first flat member 3, the material flows across the surfaces of the bare fibers 1, covers the surface of the first flat member 3 to which the bare fibers 1 are tacked, cures, and firmly bonds the bare fibers 1 to the first flat member 3.

A silica sol, a resin material curable by actinic radiation, or another uncured material is fed to a second flat member 3' by an appropriate method, the aforementioned second flat member 3' is superposed on the bare fibers 1 bonded to the aforementioned first flat member 3 in the manner shown in FIG. 7C, the aforementioned uncured material is allowed to cure and to form a cured body, and the first flat member 3 and the second flat member 3' are monolithically joined together. The portions of the bare fibers 1 projecting outward beyond the tips of the monolithically joined first flat member 3 and second flat member 3' are removed, yielding an optical fiber array for connecting blocks.

Second Embodiment

Figure 14B:
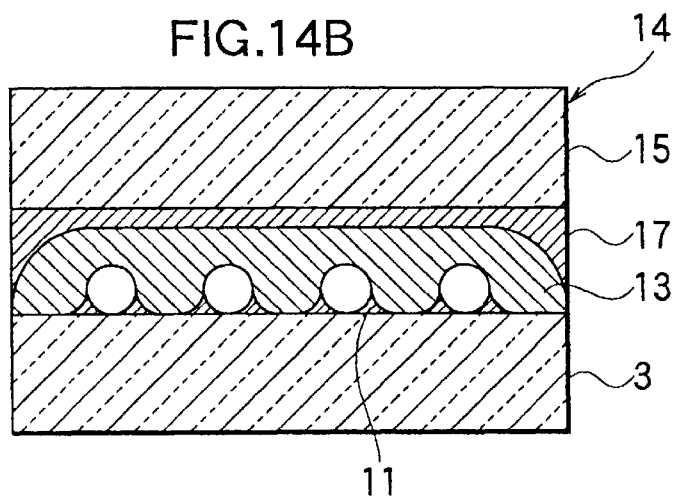
Figure 15B:
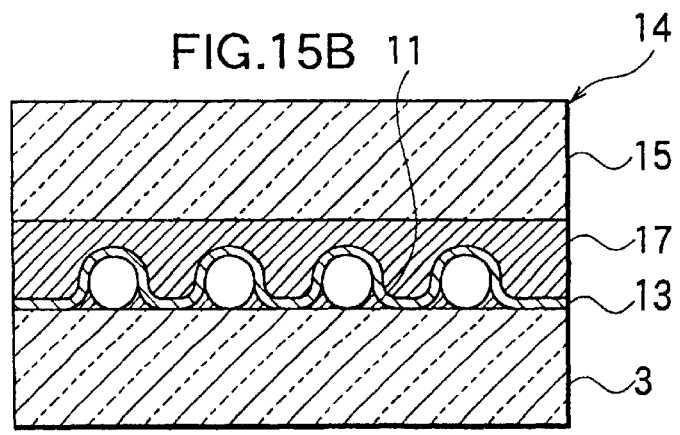

Although the optical fiber array pertaining to the First Embodiment is configured such that the bare fibers 1 are sandwiched between the flat member 3 and the flat surface 15 of the array body 14 in the manner shown in FIGS. 5, 14B, and 15B, it is also possible to configure an optical fiber array without the use of the aforementioned flat member 3.

Figure 8:
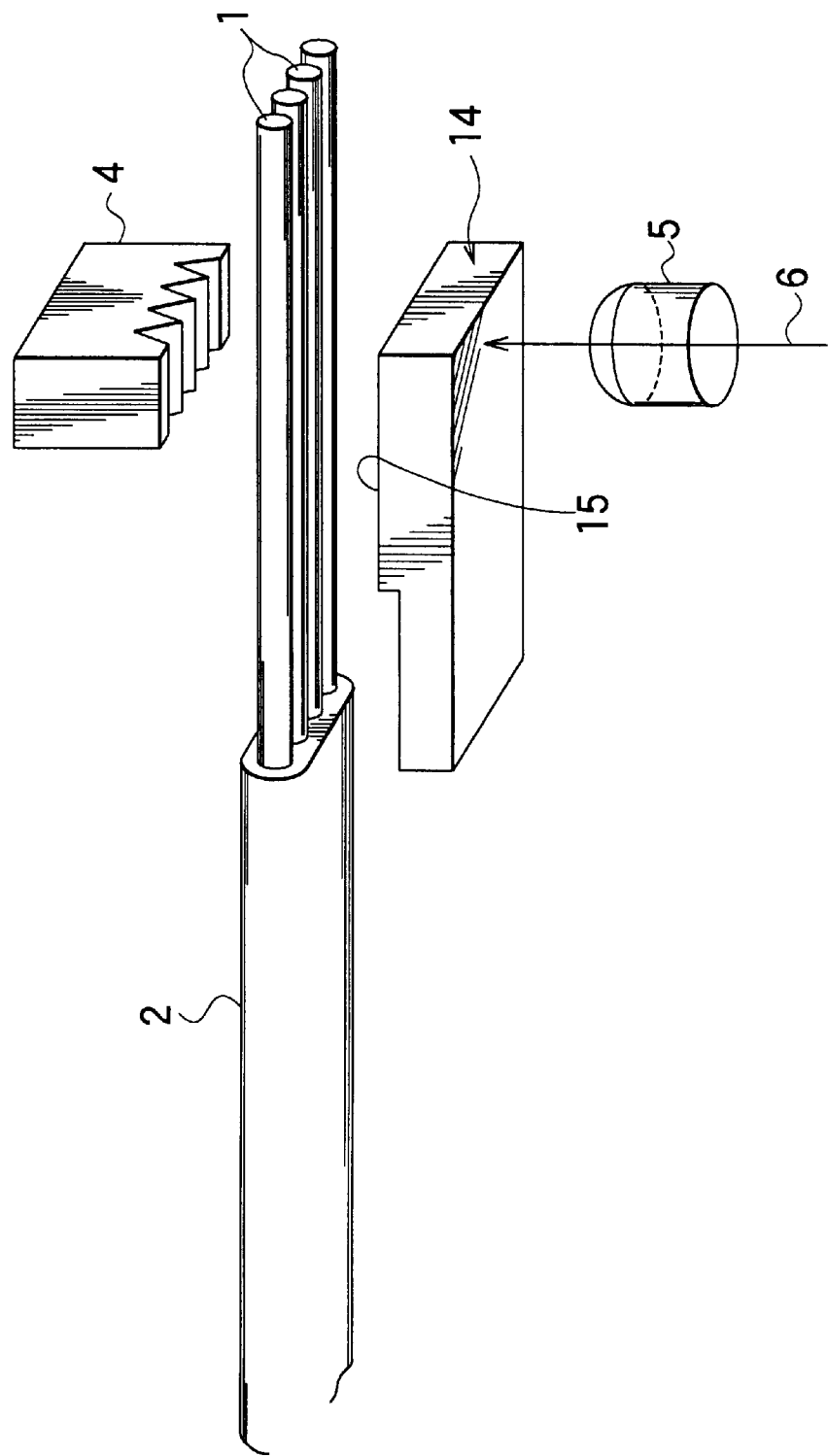
FIG. 8 is a schematic perspective view of the apparatus and structural members used in the implementation of the method for manufacturing an optical fiber array in accordance with a Second Embodiment.

In FIG. 8, which depicts the apparatus and structural members used in the implementation of a method for manufacturing an optical fiber array without the use of the aforementioned flat member 3, 1 is a bare fiber, 2 is a fiber ribbon, 14 is an array body having a flat surface 15, 4 is a bare-fiber guide, 5 is a transparent pressure means, and 6 is UV light or another type of actinic radiation.

Figure 9:
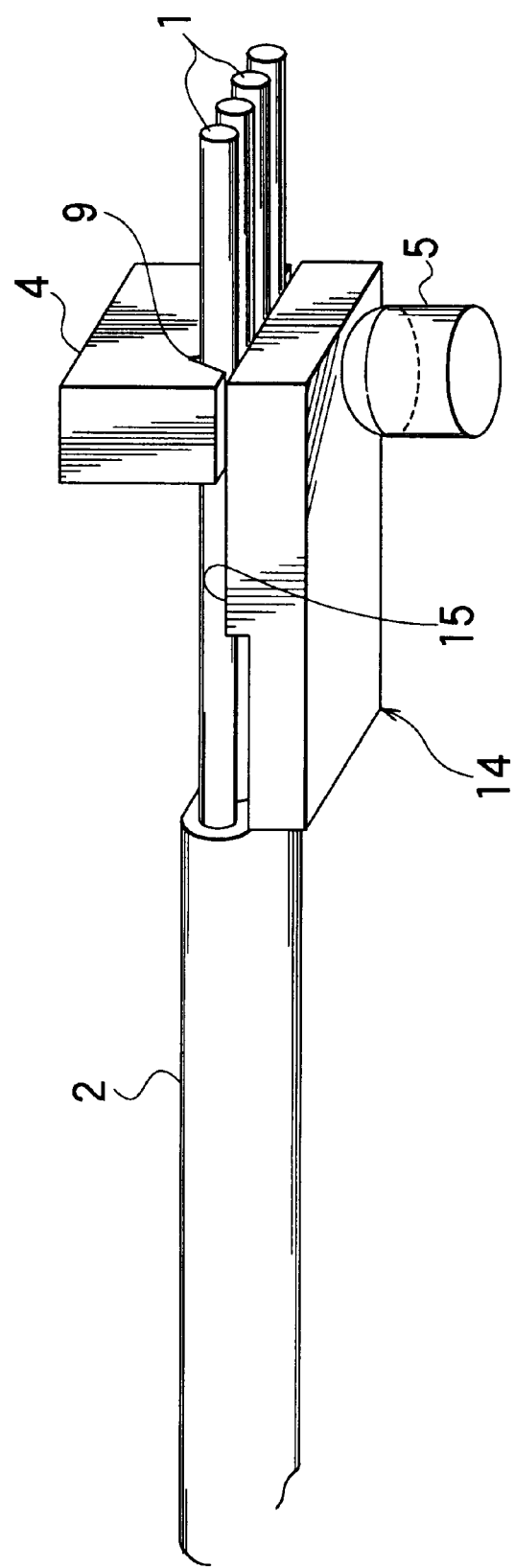
FIG. 9 is a schematic perspective view depicting the steps for manufacturing an optical fiber array in accordance with the Second Embodiment.

First, the fiber ribbon 2 is placed on a fiber-ribbon attachment block (not shown) in the manner depicted in FIG. 9, and the aforementioned bare fibers 1 are placed and aligned in the guide grooves (V grooves) 9 of the bare-fiber guide 4. In this Embodiment, a means for tacking the bare fibers 1 onto the aforementioned flat surface 15 using an indirect bonding means is adopted.

Next, as shown in FIG. 9, the flat surface 15 of the array body 14 provided with an adhesive layer is brought into contact with the bare fibers 1 aligned by the aforementioned bare-fiber guide 4, pressure is applied by the transparent pressure means 5 to the back of the flat surface 15, the bare fibers 1 are tacked onto the aforementioned flat component surface 15 by an indirect bonding means while the bare fibers 1 are sandwiched between the bare-fiber guide 4 and the flat surface 15, and the bare fibers 1 and the bare-fiber guide 4 are then separated.

A silica sol, a resin material curable by actinic radiation, or the like is subsequently applied to the aforementioned flat component surface 15 to which the bare fibers 1 are tacked, a thick or thin cured layer 13 is formed by gelation or exposure to actinic radiation, the portions of the bare fibers 1 projecting outward beyond the tips of the aforementioned flat surface 15 are then removed, and the optical fiber array (see FIGS. 14A and 15A) pertaining to this Embodiment is thus completed.

The manufacturing costs of the optical fiber array pertaining to this Embodiment are lower than those of the optical fiber array pertaining to the First Embodiment shown in FIG. 5 due to the absence of the flat member. The absence of the flat member results in a somewhat lower mechanical strength, making it more preferable that a thick cured layer 13 be used for the bonding of the aforementioned bare fibers 1. A filler selected from glass fibers, glass powder, carbon fibers, and mineral powder should preferably be added to the resin material when the aforementioned cured layer 13 is composed of this material.

Third Embodiment

This Embodiment relates to a method for manufacturing an optical fiber array by superposing a first array body to which first bare fibers are bonded, and a second array body to which second bare fibers are bonded.

Figure 10:
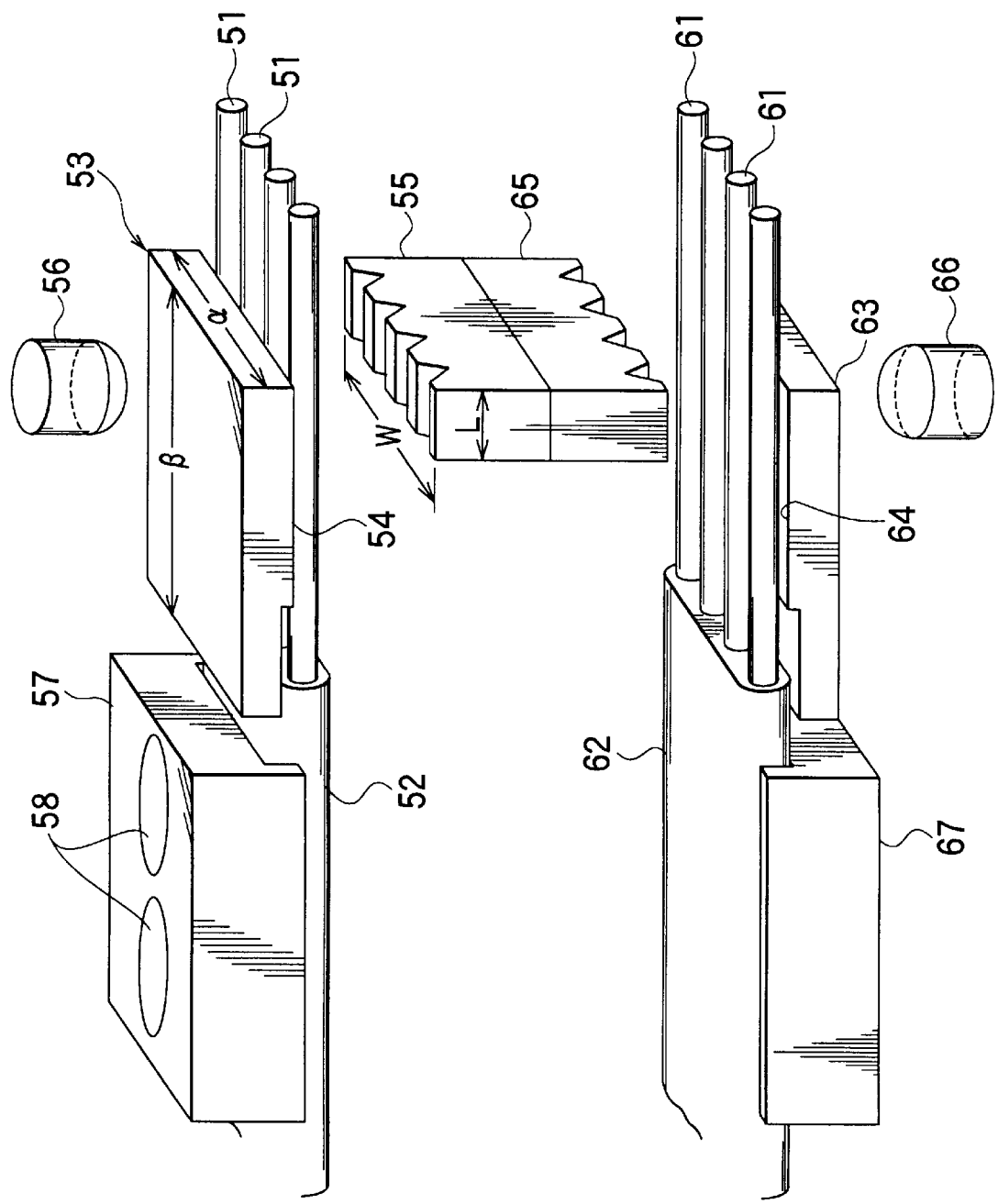
FIG. 10 is a schematic perspective view of the apparatus and structural members used in the implementation of the method for manufacturing an optical fiber array in accordance with a Third Embodiment.

In FIG. 10, which depicts the apparatus and structural members used in the implementation of a method for manufacturing this optical fiber array, 51 is a first bare fiber, 52 is a first fiber ribbon, 53 is a first array body having a flat surface 54, 55 is a first bare-fiber guide, 56 is a first transparent pressure means, and 57 is a first fiber-ribbon attachment block provided with a suction port 58. In addition, 61 is a second bare fiber, 62 is a second fiber ribbon, 63 is a second array body having a flat surface 64, 65 is a second bare-fiber guide, 66 is a second transparent pressure means, and 67 is a second fiber-ribbon attachment block provided with a suction port (not shown).

Figure 11:
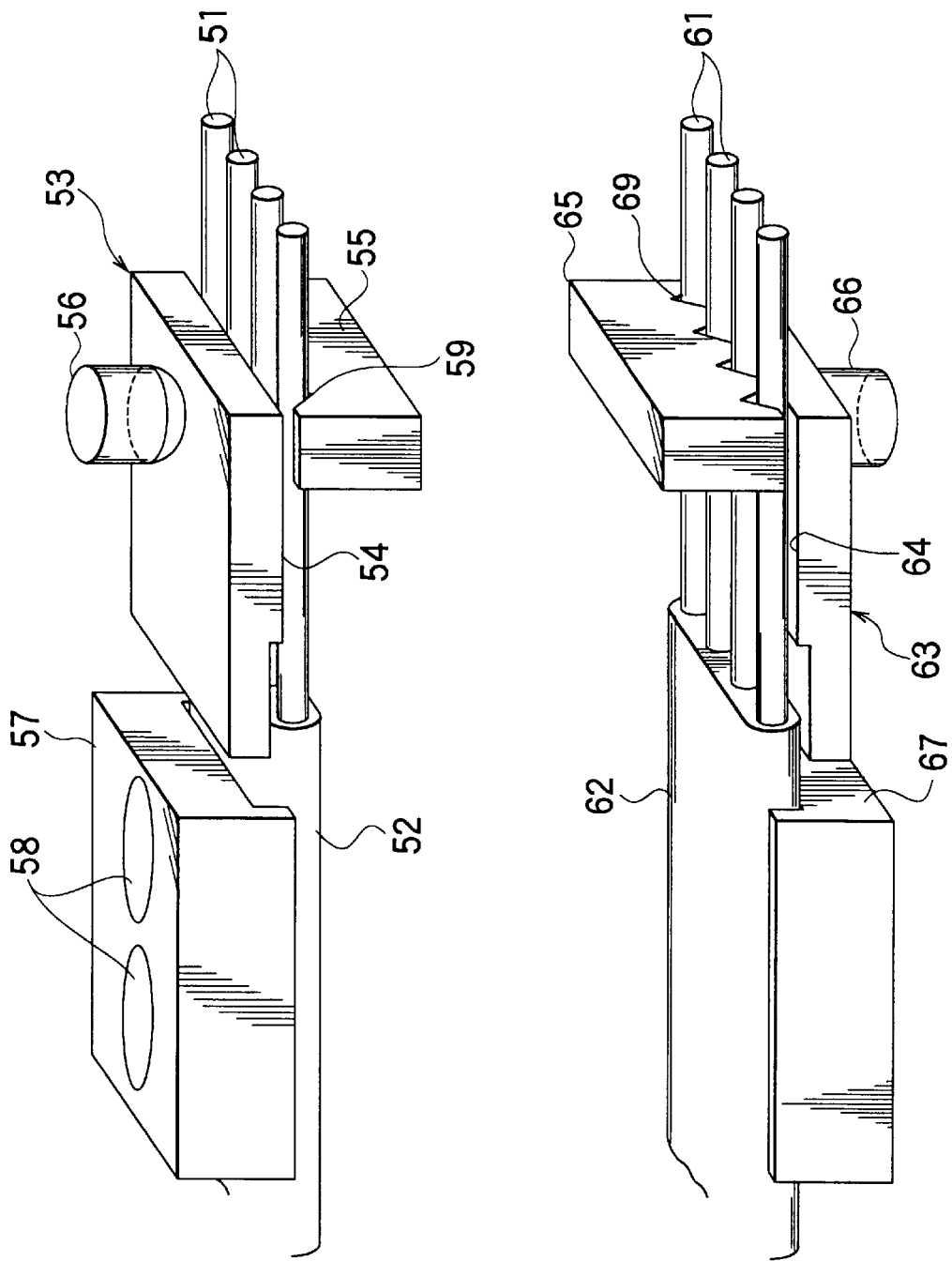
FIG. 11 is a schematic perspective view depicting the steps for manufacturing an optical fiber array in accordance with the Third Embodiment.

First, the first fiber ribbon 52 is placed on the first fiber-ribbon attachment block 57 as shown in FIG. 11, and the aforementioned first bare fibers 51 are placed and aligned in the guide grooves (V grooves) 59 of the first bare-fiber guide 55. Similarly, the second fiber ribbon 62 is placed on the second fiber-ribbon attachment block 67, and the aforementioned second bare fibers 61 are placed and aligned in the guide grooves (V grooves) 69 of the second bare-fiber guide 65. This Embodiment involves using a technique for tacking the first bare fibers 51 and the second bare fibers 61 onto the aforementioned flat surfaces 54 and 64 with the aid of an indirect bonding means.

Next, as shown in FIG. 11, the flat surface 54 of the first array body 53 provided with an adhesive layer is brought into contact with the first bare fibers 51 aligned by the aforementioned first bare-fiber guide 55, pressure is applied by the first transparent pressure means 56 to the back of the flat surface 54, the first bare fibers 51 are tacked onto the aforementioned flat component surface 54 by an indirect bonding means while the first bare fibers 51 are sandwiched between the first bare-fiber guide 55 and the flat surface 54, and the first bare fibers 51 and the first bare-fiber guide 55 are then separated. Similarly, the flat surface 64 of the second array body 63 provided with an adhesive layer is brought into contact with the second bare fibers 61 aligned by means of the aforementioned second bare-fiber guide 65, pressure is applied by the second transparent pressure means 66 to the back of the flat surface 64, the second bare fibers 61 are tacked onto the aforementioned flat component surface 64 by an indirect bonding means while the second bare fibers 61 are sandwiched between the second bare-fiber guide 65 and the flat surface 64, and the second bare fibers 61 and the second bare-fiber guide 65 are then separated.

Figure 12:
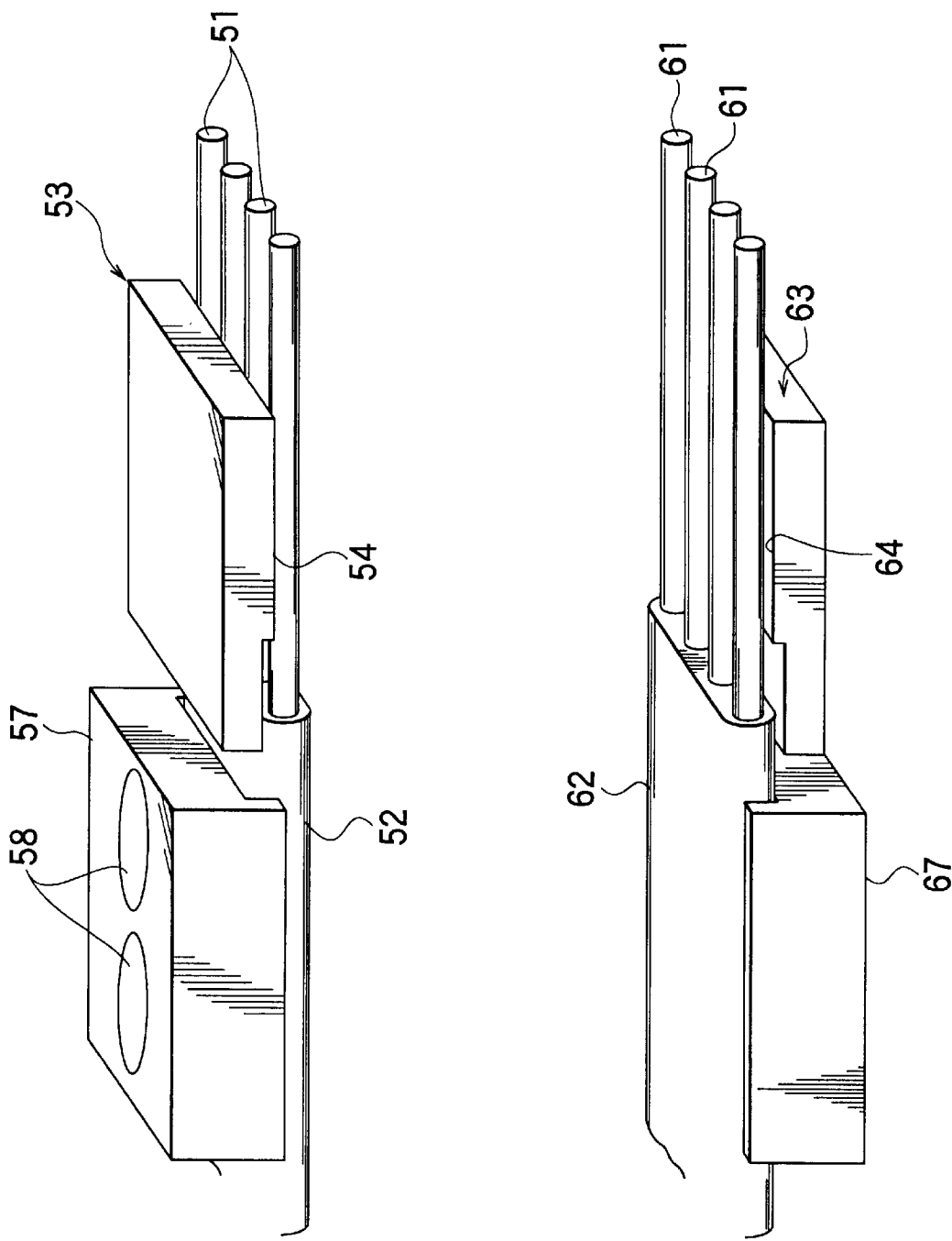
FIG. 12 is a schematic perspective view depicting the steps for manufacturing an optical fiber array in accordance with the Second Embodiment.

When a silica sol, a resin material curable by actinic radiation, or the like is subsequently allowed to fall in drops on the first bare fibers 51 extending toward the tip portion from the flat surface 54 of the first array body 53 in the manner shown in FIG. 12, the material flows across the surfaces of the first bare fibers 51 and covers the flat surface 54 to which the first bare fibers 51 are tacked. Similarly, allowing a silica sol, a resin material curable by actinic radiation, or the like to subsequently fall in drops on the second bare fibers 61 extending toward the tip portion from the flat surface 64 of the second array body 63 causes the material to flow across the surfaces of the second bare fibers 61 and to cover the flat surface 64 to which the second bare fibers 61 are tacked. The method for applying these materials is not limited to the above-described technique, and any application method may be used. When a silica sol is used as such a material, an exhaust opening (not shown) should preferably be provided in advance to at least one of the flat surfaces 54 and 64 in order to allow solvents and the like to escape with greater ease during gelation.

Figure 19:
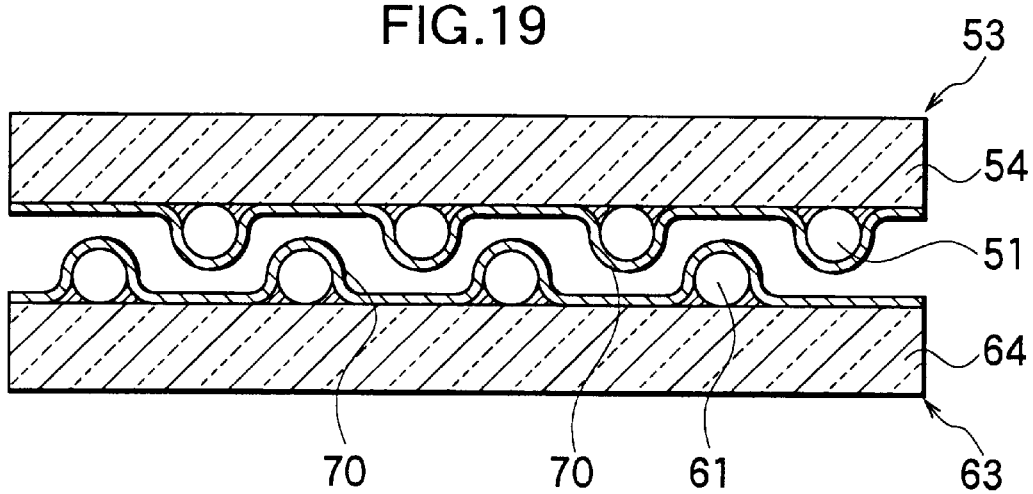
FIG. 19 is a diagram illustrating the steps for manufacturing an optical fiber array in accordance with the Third Embodiment.
Figure 20:
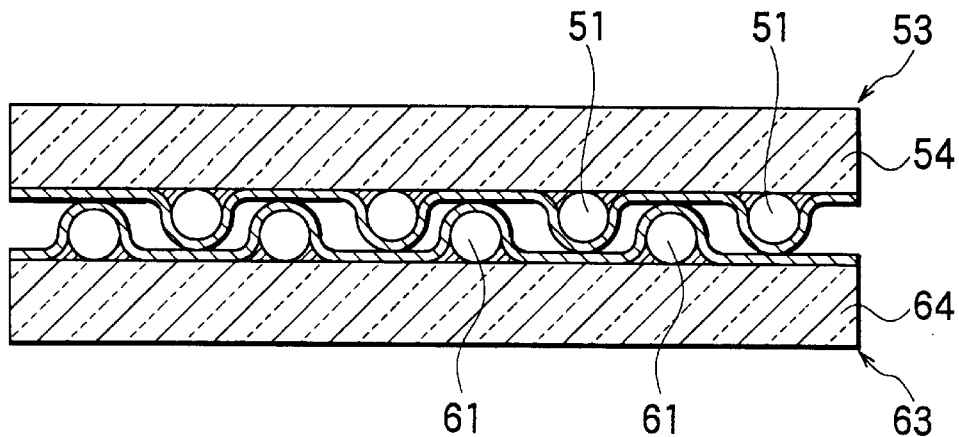
FIG. 20 is a diagram illustrating the steps for manufacturing an optical fiber array in accordance with the Third Embodiment.
Figure 21:
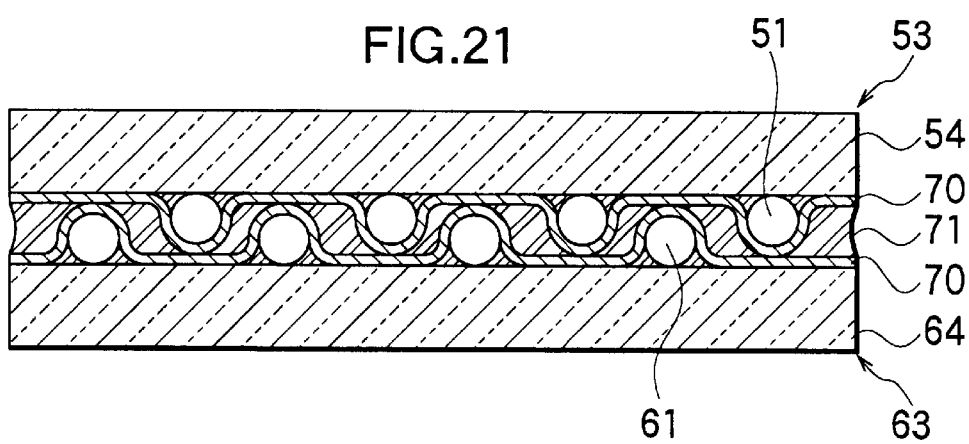
FIG. 21 is a diagram illustrating the steps for manufacturing an optical fiber array in accordance with the Third Embodiment.

A thick or thin cured layer 70 (see FIG. 19) is formed by the gelation of the silica sol or by exposure of the resin material to actinic radiation; the aforementioned first array body 53 and second array body 63 are superposed such that the first bare fibers 51 are disposed in central positions between the second bare fibers 61 in the second array body 63, and the second bare fibers 61 are disposed in central positions between the first bare fibers 51 in the first array body 53 in the manner shown in FIG. 20; the spaces between the flat surface 54 of the first array body 53 and the flat surface 64 of the second array body 63 are filled with a silica sol, a resin material curable by actinic radiation, or another uncured material in the manner shown in FIG. 21; this material is cured and caused to form a cured body 71; and the first array body 53 and the second array body 63 are monolithically joined together. The first array body 53 and the second array body 63 are aligned by causing the lateral surfaces of the two bodies to abut along a common plane. In the presense of alignment between the first array body 53 and the second array body 63, the alignment positions occupied by the first bare fibers 51 and second bare fibers 61 during tacking are adjusted such that the first bare fibers 51 are disposed in central positions between the second bare fibers 61, and the second bare fibers 61 are disposed in central positions between the first bare fibers 51.

Figure 22:
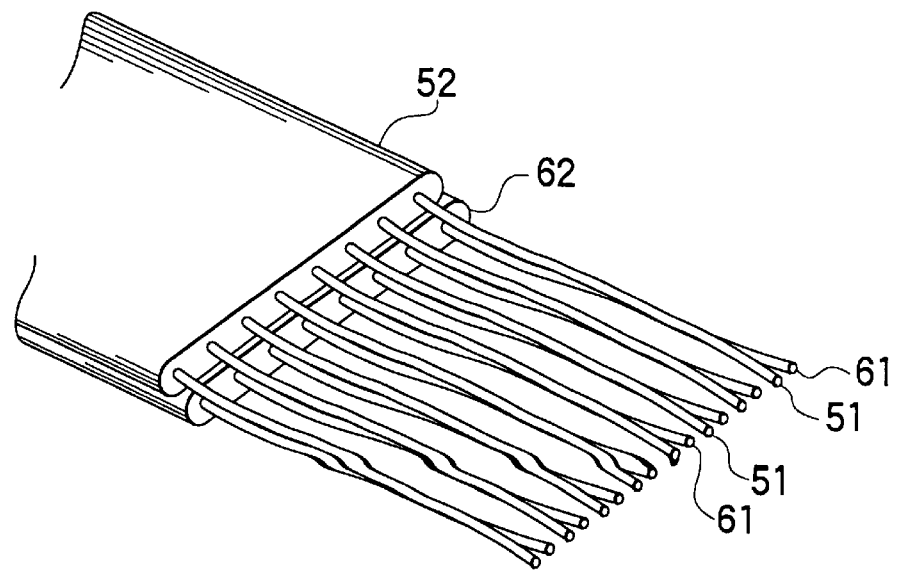
FIG. 22 is a fragmentary schematic perspective view depicting a state in which the first fiber ribbon 52 and the second fiber ribbon 62 are laminated (the first array body 53 and the second array body 63, which are the structural members of the optical fiber array pertaining to the Third Embodiment, are not shown in the drawing)

Finally, the portions of the first bare fibers 51 and second bare fibers 61 projecting outward beyond the tips of the monolithically joined flat surface 54 of the first array body 53 and the flat surface 64 of the second array body 63 are removed, and the optical fiber array (see FIG. 21) pertaining to this Embodiment is thus completed. FIG. 22 depicts a state in which the first fiber ribbon 52 and the second fiber ribbon 62 are laminated with each other (omitted from the drawing are the first array body 53 and second array body 63, which are structural members of the optical fiber array pertaining to this Embodiment).

According to this Embodiment, the alignment density of the bare fibers in a completed optical fiber array is twice the alignment density of the bare fibers aligned with the aid of the first bare-fiber guide 55 or second bare-fiber guide 65 in the manufacturing step, making it possible to manufacture an optical fiber array in which the bare fibers have high alignment density. Another advantage is that because an optical fiber array having the desired alignment density can be manufactured using a bare-fiber guide whose density is only half the desired alignment density, the processing of the bare-fiber guide is made proportionally simpler, and the manufacturing costs can also be reduced.

In this Embodiment, work involved in the alignment of first bare fibers and work involved in the alignment of second bare fibers was conducted simultaneously through the use of the first bare-fiber guide 55 and second bare-fiber guide 65, but it is also possible to adopt a manufacturing procedure in which a single bare-fiber guide is used to consecutively manufacture a first array body 53 to which first bare fibers 51 are tacked, and a second array body 63 to which second bare fibers 61 are tacked, and to monolithically join the components by means of a silica sol, a resin material or the like.

Examples of the present invention will now be described in detail.

EXAMPLE 1

Figure 23A:
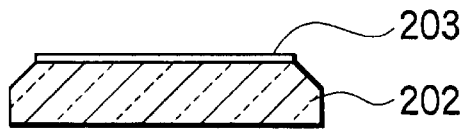
FIGS. 23A to 23E are diagrams illustrating the steps for manufacturing an optical fiber array in accordance with Example 1.

Drops of an ultraviolet-curing epoxy resin (Epo-Tek OG146™, manufactured by Epoxy Technology) were first allowed to fall on the flat surface of a glass array body 202, and excess resin was then blown off by rotating the array body 202 at a high speed, yielding an adhesive layer 203 with a thickness of 10 μm (see FIG. 23A). The edges of the flat surface (that is, the surface for forming the adhesive layer) on the array body 202 were chamfered, as shown in FIG. 23A.

Bare fibers 201 were subsequently placed and aligned in the guide grooves of a ceramic- bare-fiber guide 204, in which a plurality of such guide grooves were provided on one side (see FIG. 23B). The interval between the V-shaped guide grooves was 127 μm, the diameter of the bare fibers 201 was 125 μm, and the gap between adjacent bare fibers was 2 μm.

Figure 23B:
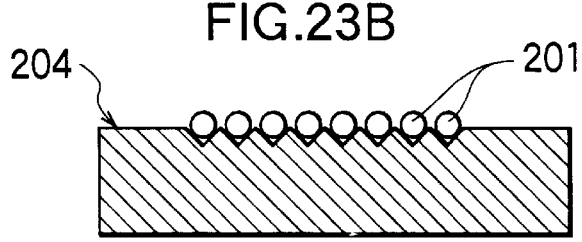
Figure 23C:
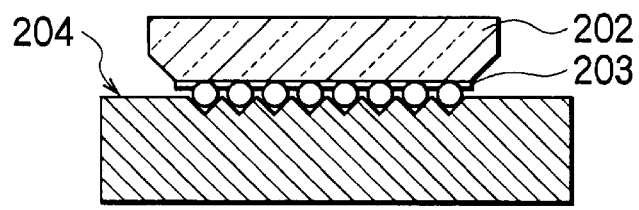
Figure 23D:
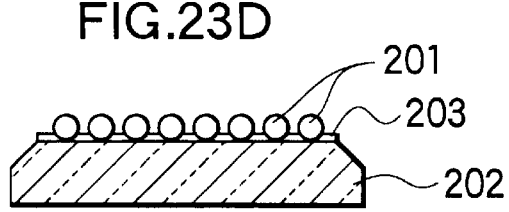

The surface of the array body 202 on which the adhesive layer 203 had been formed was then superposed as shown in FIG. 23C while the bare fibers 201 remained in the guide grooves of the bare-fiber guide 204, and a load was applied to bond together the flat surface (surface for forming the adhesive layer) of the array body 202 and the upper ends of the bare fibers 201, whereupon the level of the resin constituting the adhesive layer 203 in the area of contact between the flat surface and the bare fibers 201 moved across the lateral surfaces of the bare fibers 201, forming liquid resin beads on the lateral surfaces of the bare fibers 201. The liquid resin beads were shaped to perform a reinforcing function following resin curing. Specifically, the beads became the aforementioned tacking/reinforcing members. Curing the aforementioned adhesive layer 203 by exposing it to UV light through the array body 202 in this state yielded a structure in which a plurality of bare fibers 201 were tacked onto the flat surface of the array body 202, as shown in FIG. 23D.

The external peripheral surfaces of the tacked bare fibers 201 and the flat surface of the array body 202 exposed between the bare fibers 201 were subsequently covered with a thin layer of a heat-curing epoxy resin (Epo-Tek 353ND™, manufactured by Epoxy Technology), the resin was cured by heat, and the bare fibers 201 were bonded to the aforementioned flat surfaces.

Figure 23E:
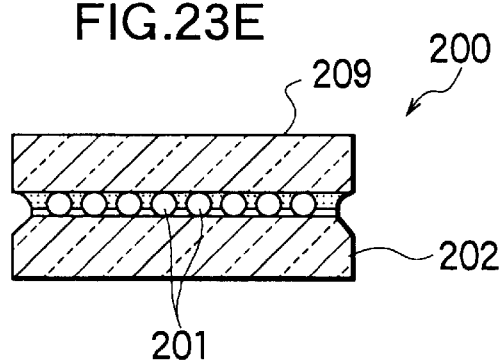

A flat member 209 made of glass was subsequently placed on the aforementioned structure on the side facing the row of bare fibers 201, the gap between the array body 202 and the flat member 209 was filled with the aforementioned heat-curing epoxy resin (Epo-Tek 353ND™, manufactured by Epoxy Technology) through the areas near the end faces thereof, the assembly was then heat-treated under load to cure the epoxy resin, and the array body 202 and the flat member 209 were monolithically joined together (see FIG. 23E).

The optical fiber array 200 for connecting blocks that pertained to Example 1 was ultimately completed by polishing and flattening the end faces thereof.

Epo-Tek OG146™ (manufactured by Epoxy Technology), which is a UV-curing epoxy resin, and Epo-Tek 353ND™ (manufactured by Epoxy Technology), which is a heat-curing epoxy resin, were used in this Example. It was also possible to use, for example, Epo-Tek 301™ (manufactured by Epoxy Technology), Three Bond 2280C™ (manufactured by Three Bond), and other heat-curing epoxy resins; Optomer KR-500™ (manufactured by Asahi Denka Kogyo) and other UV-curing epoxy resins; Three Bond 3102™ (manufactured by Three Bond), Optomer KS-800™ (manufactured by Asahi Denka Kogyo), and other dual-use UV- and heat-curing resins; LOCTITE 394™ (manufactured by LOCTITE), Optokleb M05™ (manufactured by ADELL), Optokleb UT20™ (manufactured by ADELL), and other UV-curing acrylic resins; UV-curing polyimide resins; heat-curing acrylic resins; heat-curing polyimide resins; or the like.

Glass fibers, glass powders, carbon fibers, mineral powders, and other fillers could also be added to the aforementioned UV-curing epoxy resins and heat-curing epoxy resins.

In addition, the surfaces of the glass array body 202 and flat member 209 could be roughened (to an arithmetic mean roughness Ra of 0.5 μm) using, for example, a polishing powder with a grain size of about 7 μm to firmly bond the UV-curing epoxy resin, heat-curing epoxy resin, or the like.

EXAMPLE 2

An optical fiber array was manufactured in roughly the same manner as in Example 1, except that a flat member 209 equipped with the exhaust opening shown in FIG. 4 was used and that a silica sol was used instead of the aforementioned UV-curing epoxy resin and heat-curing epoxy resin.

The following polymer was used as the aforementioned silica sol: a polymer obtained by adding water or an acid catalyst to an o-alkyl silicate to induce hydrolysis and to promote dehydrocondensation; a polymer obtained by inducing hydrolysis and dehydrocondensation in a commercially available alkyl silicate solution already hydrolyzed and dehydrocondensed to a tetra- or pentamer; or the like. Because initiating dehydrocondensation caused solution viscosity to rise and ultimately resulted in solidification, the degree of dehydrocondensation was adjusted to a level below the maximum allowable viscosity of coating for flat members or the like.

The silica sol used in Example 2 was obtained by preparing a composition having an $SiO_2$ (silicon oxide) solids concentration of 10 wt % (using 19.6 weight parts Methylsilicate 51™ (manufactured by Colcoat), 57.8 weight parts ethanol, 7.9 weight parts 1% nitric acid aqueous solution, and 14.7 weight parts purified water) and partially drying the composition to obtain a final product having an $SiO_2$ solids concentration of 50 wt %.

An optical fiber array in which the alignment interval between the bare fibers was set with high accuracy could be manufactured at a low cost in the same manner as in Example 1.

EXAMPLE 3

An optical fiber array was manufactured in roughly the same manner as in Example 1, except that the bare fibers were tacked onto the flat surface of the glass array body 202 by an anodic bonding technique in which a bare-fiber guide made of tungsten was used, an electrode was placed on the back of a flat surface, a voltage of 1500 V was applied between the bare-fiber guide and the electrode, and the area containing the aforementioned bare-fiber guide, electrode, array body, and bare fibers was kept in a nitrogen gas atmosphere at a temperature of 800° C.

An optical fiber array in which the alignment interval between the bare fibers was set with high accuracy could be manufactured at a low cost in the same manner as in Example 1.

EXAMPLE 4

In this Example, an array body 302 was composed of a first array body 321 and a second array body 322.

Figure 24A:
FIGS. 24A to 24E are diagrams illustrating the steps for manufacturing an optical fiber array in accordance with Example 4.
Figure 24B:
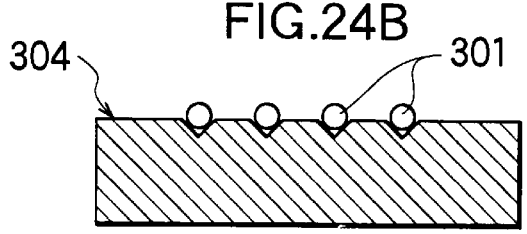

Drops of an ultraviolet-curing epoxy resin (Epo-Tek OG146™, manufactured by Epoxy Technology) were first allowed to fall on the flat surface of the first glass array body 321 with a width dimension $\alpha$ of 5 mm and a length dimension $\beta$ of 10 mm (see FIG. 10), and excess resin was then blown off by rotating the first glass array body 321 at a high speed, yielding an adhesive layer 303 with a thickness of 10 $\mu$m (see FIG. 24A). The edges of the flat surfaces (that is, the surfaces for forming the adhesive layers) on the first array body 321 and second array body 322 were chamfered, as shown in FIGS. 24A and 24D.

Bare fibers 301 were subsequently placed and aligned in the guide grooves of a ceramic bare-fiber guide 304 with a width dimension W of 8 mm and a length dimension L of 3 mm (see FIG. 10), in which a plurality of such guide grooves were provided on one side (see FIG. 24B). The interval between the V-shaped guide grooves was 254 $\mu$m, the diameter of the bare fibers 301 was 125 $\mu$m, and the gap between adjacent bare fibers was 129 $\mu$m.

Figure 24C:
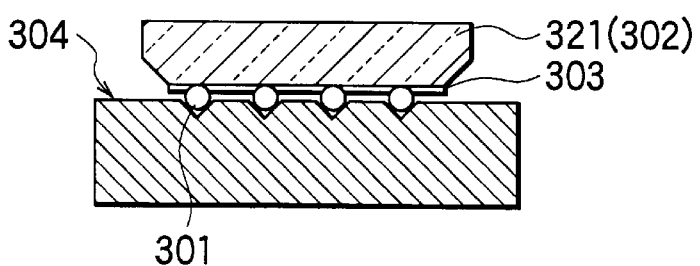
Figure 24D:
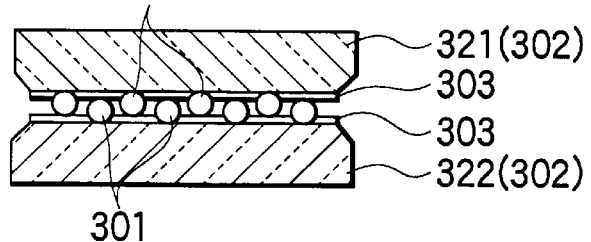

The surface of the first array body 321 on which the adhesive layer 303 had been formed was then superposed as shown in FIG. 24C while the bare fibers 301 remained in the guide grooves of the ceramic bare-fiber guide 304, and a load was applied to bond together the flat surface (surface for forming the adhesive layer) of the first array body 321 and the upper ends of the bare fibers 301, whereupon the level of the resin constituting the adhesive layer 303 in the area of contact between the flat surface and the bare fibers 301 moved across the lateral surfaces of the bare fibers 301, forming liquid resin beads on the lateral surfaces of the bare fibers 301. The liquid resin beads were shaped to perform a reinforcing function following resin curing. Specifically, the beads became the aforementioned tacking/reinforcing members. Curing the aforementioned adhesive layer 303 by exposing it to UV light through the first array body 321 in this state yielded a structure in which a plurality of bare fibers 301 were tacked onto the flat surface of the first array body 321.

The external peripheral surfaces of the tacked bare fibers 301 and the flat surface of the first array body 321 exposed between the bare fibers 301 were subsequently covered with a thin layer of a heat-curing epoxy resin (Epo-Tek 353ND™, manufactured by Epoxy Technology), the resin was cured by heat, and the bare fibers 301 were bonded to the aforementioned flat surfaces.

Another structure in which a plurality of bare fibers 301 were bonded to the flat surface of a second array body 322 was manufactured in the same sequence, and the two structures were combined such that the sides containing rows of bonded bare fibers faced each other, as shown in FIG. 24D. To achieve horizontal alignment in the two structures, the corresponding lateral surfaces were abutted on and positioned along a common plane. In addition, the positions of the bare fibers on the structures during tacking were adjusted in advance such that the bare fibers on one of the structures were disposed exactly in the centers of the intervals between the bare fibers on the other structure when the optical fibers on the structures were combined in a facing arrangement.

Figure 24E:
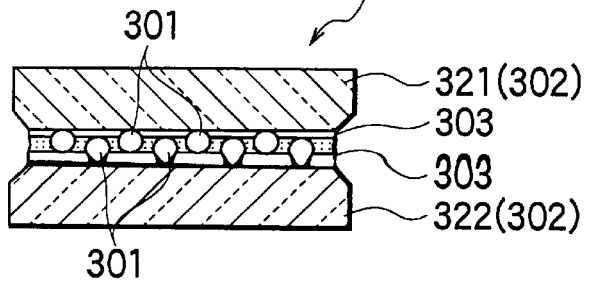
Figure 25A:
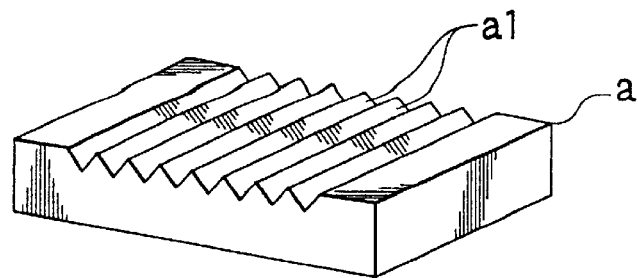
FIG. 25A is a schematic perspective view of a V groove member pertaining to a conventional example.
Figure 25B:
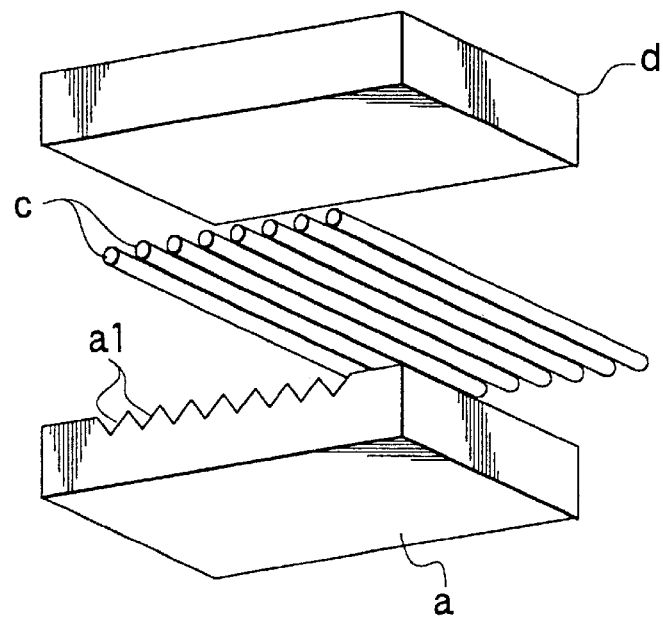
FIG. 25B is an exploded view of a conventional optical fiber array to which a V groove member is provided as a structural member.
Figure 25C:
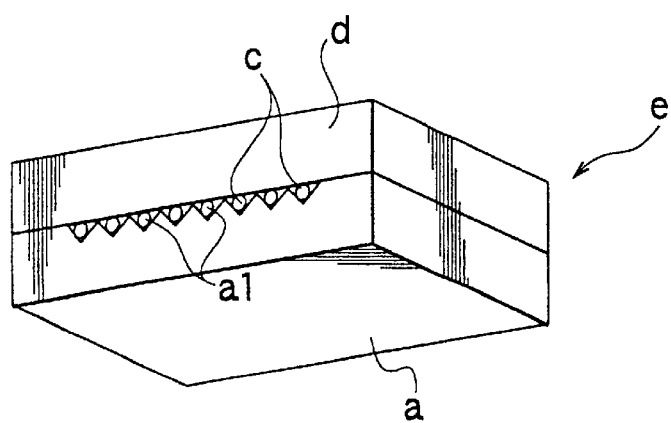
FIG. 25C is a schematic perspective view of a conventional optical fiber array.
Figure 26:
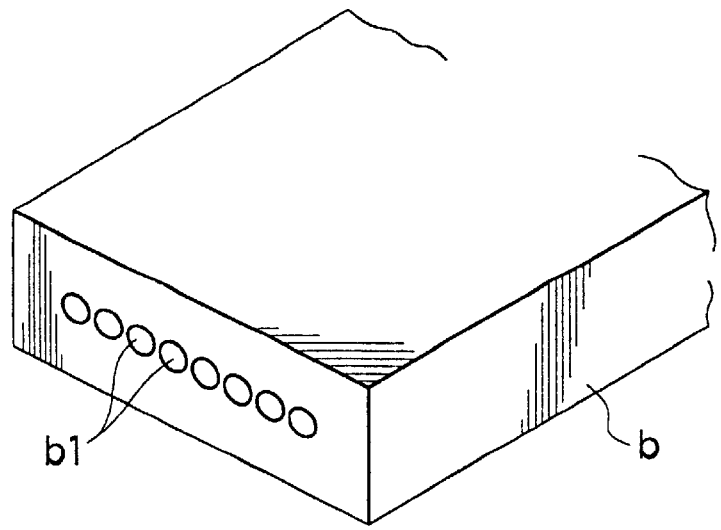
FIG. 26 is a schematic perspective view of a capillary member pertaining to a conventional example.
Figure 27:
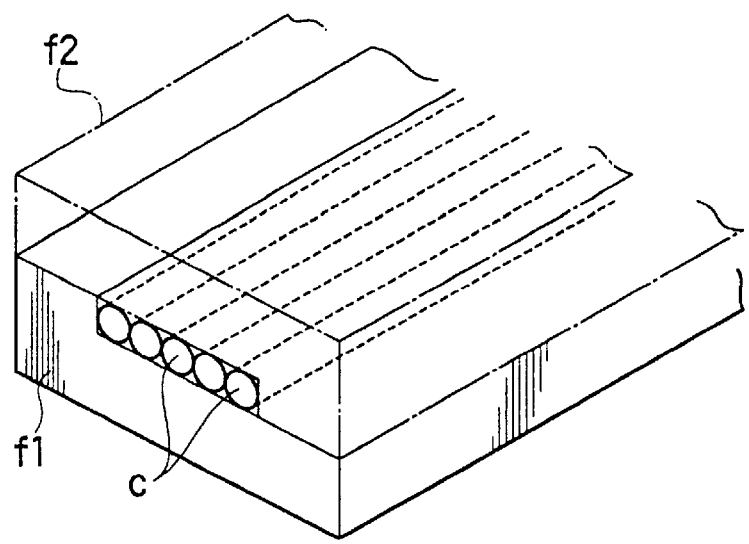
FIG. 27 is a diagram illustrating a conventional method in which optical fibers are confined using two tabular members with generally L-shaped cross sections instead of a V groove member or a capillary member.
Figure 28A:
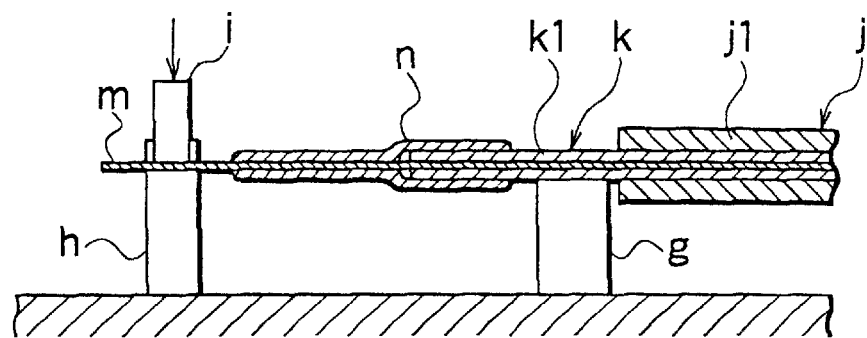
FIGS. 28A to 28C are diagrams illustrating the steps for manufacturing an optical fiber array pertaining to a conventional example without providing a bare fiber guide member.
Figure 28B:
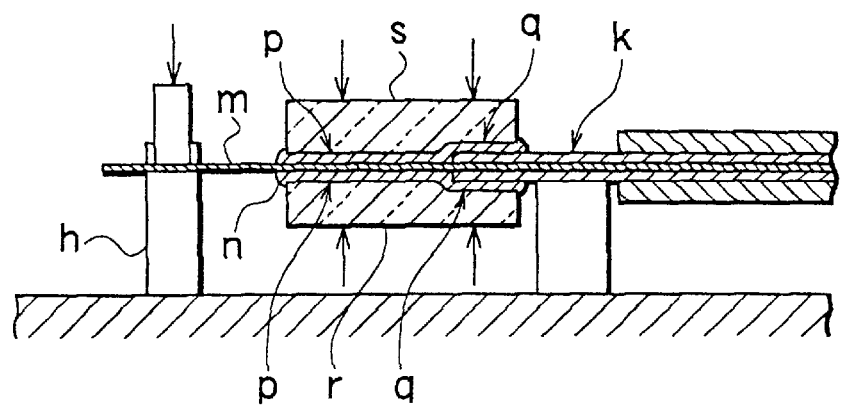
Figure 28C:
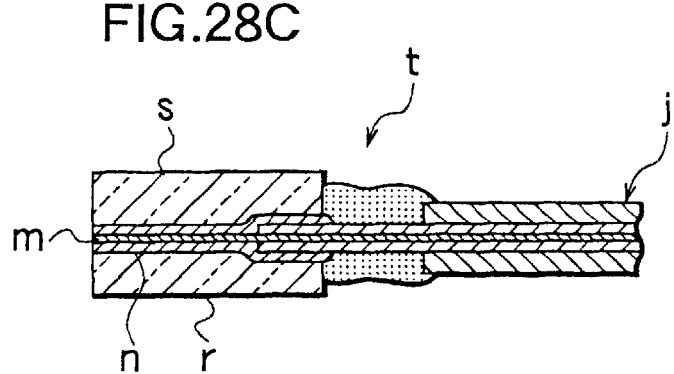
Figure 29:
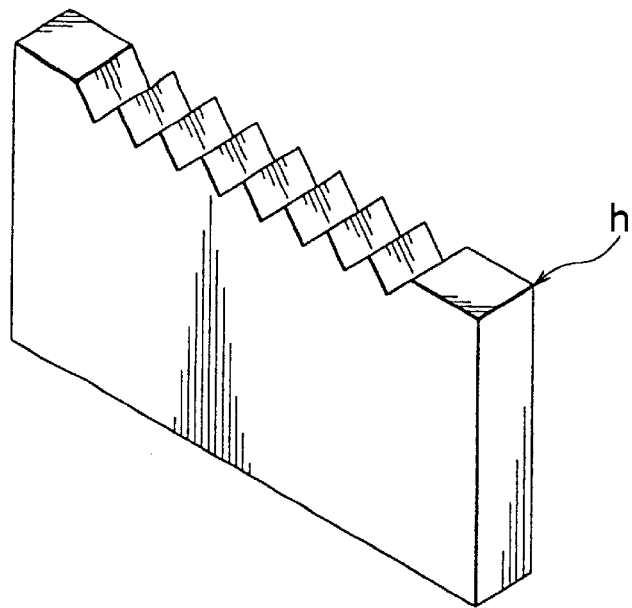
FIG. 29 is a schematic perspective view of the bare-fiber guide used in the method for manufacturing the optical fiber array pertaining to the conventional example without providing a bare fiber guide member.
Figure 30:
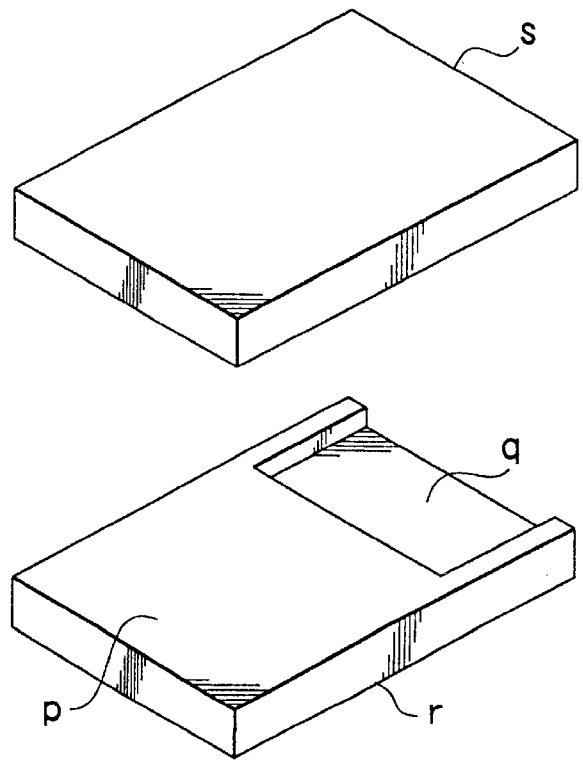
FIG. 30 is a schematic perspective view of the top and bottom plates used in the method for manufacturing the optical fiber array pertaining to the conventional example without providing a bare fiber guide member.

The gap between the combination of the first array body 321 and second array body 322 was filled with a heat-curing epoxy resin (Epo-Tek 353ND™, manufactured by Epoxy Technology) through the areas near the end faces thereof, the assembly was then heat-treated under load to cure the epoxy resin, and the first array body 321 and the second array body 322 were monolithically joined together (see FIG. 24E).

The optical fiber array 300 for connecting blocks that pertained to Example 4 was ultimately completed by polishing and flattening the end faces thereof.

The methods for manufacturing optical fiber arrays according to Examples 1 and 4 were then compared, and it was found (as can be seen in FIGS. 23B and 24B) that the alignment density of the optical fiber array obtained in Example 4 was roughly the same as the alignment density of Example 1 even when the interval between the V-shaped guide grooves was 254 $\mu$m, or greater than the interval (127 $\mu$m) in Example 1. A resulting advantage is that simpler machining can be performed, the manufacturing costs of the bare-fiber guide 304 can be reduced somewhat, and the product can better withstand repeated use because the mechanical strength of the bare-fiber guide 304 is also higher to a certain extent.

Thus, the first, second, and third manufacturing methods of the present invention are advantageous in that the alignment interval between bare fibers can be set with high accuracy because the section of the bare fibers sandwiched between the bare-fiber guide and the flat surface of the array body or the flat member is incorporated into the optical fiber array.

Another advantage is that the alignment positions of bare fibers do not change during subsequent treatments because an uncured material is used to form a coating on the flat surface of the array body or the flat member exposed between the bare fibers and on the external peripheral surfaces of the bare fibers tacked to the flat surface of the array body or the flat member, and because this material is cured to bond the bare fibers to the flat surface of the aforementioned array body or the flat member.

Yet another advantage is that because the aforementioned bare-fiber guide can be used repeatedly without being incorporated into the optical fiber array as a structural member, the manufacturing costs of the optical fiber array can be made proportionally lower.

In particular, the third manufacturing method of the present invention is advantageous in that the alignment density of the bare fibers in a completed optical fiber array is twice the alignment density of the first bare fibers or second bare fibers aligned with the aid of the first bare-fiber guide or second bare-fiber guide, respectively, during the manufacturing step, making it possible to manufacture an optical fiber array whose bare fibers have high alignment density, and that because an optical fiber array having the desired alignment density can be manufactured using a bare-fiber guide whose density is only half the desired alignment density, the processing of the bare-fiber guide is made proportionally simpler, and the manufacturing costs can also be reduced.

What is claimed is:

1. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing the flat surface of an array body into contact with the bare fibers aligned by means of said bare-fiber guide, tacking the bare fibers onto the flat surface of said array body by direct bonding means while keeping the bare fibers sandwiched between said bare-fiber guide and the flat surface of the array body, and separating the bare fibers and the bare-fiber guide thereafter; and forming a coating of uncured material on the external peripheral surfaces of the bare fibers tacked onto the flat surface of said array body and on the flat surface of the array body exposed between the bare fibers, curing this material, and bonding the bare fibers to the flat surface of said array body.

2. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing the flat surface of an array body into contact with the bare fibers aligned by means of said bare-fiber guide, tacking the bare fibers onto the flat surface of said array body by indirect bonding means while keeping the bare fibers sandwiched between said bare-fiber guide and the flat surface of the array body and while exposing the flat surface of the array body from between the bare fibers, and separating the bare fibers and the bare-fiber guide thereafter; and forming a coating of uncured material on the external peripheral surfaces of the bare fibers tacked onto the flat surface of said array body and on the flat surface of the array body exposed between the bare fibers, curing this material, and bonding the bare fibers to the flat surface of said array body.

3. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing the flat surface of an array body into contact with the bare fibers aligned by means of said bare-fiber guide, tacking the bare fibers onto the flat surface of said array body by direct bonding means while keeping the bare fibers sandwiched between said bare-fiber guide and the flat surface of the array body, and separating the bare fibers and the bare-fibers guide thereafter;

forming a coating of uncured material on the external peripheral surfaces of the bare fibers tacked onto the flat surface of said array body and on the flat surface of the array body exposed between the bare fibers, curing this material, and bonding the bare fibers to the flat surface of said array body; and superposing a flat member through the agency of an uncured material on the bare fibers bonded to the flat surface of the array body, curing said material, and monolithically bonding the flat member and the flat surface of the array body.

4. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing a flat member into contact with the bare fibers aligned by means of said bare-fiber guide, tacking the bare fibers onto the flat member by direct bonding means while keeping the bare fibers sandwiched between said bare-fiber guide and the flat member, and separating the bare fibers and the bare-fiber guide thereafter;

forming a coating of uncured material on the external peripheral surfaces of the bare fibers tacked onto the flat member and on the flat member exposed between the bare fibers, curing this material, and bonding the bare fibers to the flat member; and superposing the flat surface of said array body through the agency of an uncured material on the bare fibers bonded to the flat member, curing said material, and monolithically bonding the flat member and the flat surface of the array body.

5. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing the flat surface of an array body into contact with the bare fibers aligned by means of said bare-fiber guide, tacking the bare fibers onto the flat surface of said array body by indirect bonding means while keeping the bare fibers sandwiched between said bare-fiber guide and the flat surface of the array body and while exposing the flat surface of the array body from between the bare fibers, and separating the bare fibers and the bare-fiber guide thereafter;

forming a coating of uncured material on the external peripheral surfaces of the bare fibers tacked onto the flat surface of said array body and on the flat surface of the array body exposed between the bare fibers, curing this material, and bonding the bare fibers to the flat surface of said array body; and superposing the flat material through the agency of an uncured material on the bare fibers bonded to the flat surface of said array body, curing said material, and monolithically bonding the flat member and the flat surface of the array body.

6. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of bare fibers using a bare-fiber guide provided with a plurality of guide grooves formed in the longitudinal direction at specific intervals;

bringing a flat member into contact with the bare fibers aligned by means of said bare-fiber guide, tacking the bare fibers onto the flat member by indirect bonding means while keeping the bare fibers sandwiched between said bare-fiber guide and the flat member and while exposing the flat member from between the bare fibers, and separating the bare fibers and the bare-fiber guide thereafter;

forming a coating of uncured material on the external peripheral surfaces of the bare fibers tacked onto the flat member and on the flat member exposed between the bare fibers, curing this material, and bonding the bare fibers to the flat member; and superposing the flat surface of an array body through the agency of an uncured material on the bare fibers bonded to the flat member, curing said material, and monolithically bonding the flat member and the flat surface of the array body.

7. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of first bare fibers using a bare-fiber guide provided with a plurality of guide grooves formed in the longitudinal direction at specific intervals;

bringing the flat surface of a first array body into contact with the first bare fibers aligned by means of said bare-fiber guide, tacking the first bare fibers onto the flat surface of said first array body by direct bonding means while keeping the first bare fibers sandwiched between the bare-fiber guide and the flat surface of the first array body, and separating the first bare fibers and the bare-fiber guide thereafter;

forming a coating of uncured material on the external peripheral surfaces of the first bare fibers tacked onto the flat surface of said first array body and on the flat surface of the first array body exposed between the first bare fibers, curing this material, and bonding the first bare fibers to the flat surface of said first array body;

aligning a plurality of second bare fibers using said bare-fiber guide or another bare-fiber guide of the same structure;

bringing the flat surface of a second array body into contact with the second bare fibers aligned by means of the bare-fiber guide, tacking the second bare fibers onto the flat surface of said second array body by direct bonding means while keeping the second bare fibers sandwiched between the bare-fiber guide and the flat surface of the second array body, and separating the second bare fibers and the bare-fiber guide thereafter;

forming a coating of uncured material on the external peripheral surfaces of the second bare fibers tacked onto the flat surface of said second array body and on the flat surface of the second array body exposed between the second bare fibers, curing this material, and bonding the second bare fibers to the flat surface of said second array body; and superposing said first array body and second array body through the agency of the uncured material such that the first bare fibers are disposed in central positions between the second bare fibers in the second array body and that the second bare fibers are disposed in central positions between the first bare fibers in the first array body, curing said material, and monolithically bonding the first array body and the second array body.

8. A method for manufacturing an optical fiber array by providing a plurality of bare fibers aligned and held at specific intervals, and connecting said bare fibers to connection elements in a facing arrangement, said method for manufacturing an optical fiber array comprising the steps of:

aligning a plurality of first bare fibers using a bare-fiber guide provided with a plurality of guide grooves formed in the longitudinal direction at specific intervals;

bringing the flat surface of a first array body into contact with the first bare fibers aligned by means of said bare-fiber guide, tacking the first bare fibers onto the flat surface of said first array body by indirect bonding means while keeping the first bare fibers sandwiched between the bare-fiber guide and the flat surface of the first array body and while exposing the flat surface of the first array body from between the first bare fibers, and separating the first bare fibers and the bare-fiber guide thereafter;

forming a coating of uncured material on the external peripheral surfaces of the first bare fibers tacked onto the flat surface of said first array body and on the flat surface of the first array body exposed between the first bare fibers, curing this material, and bonding the first bare fibers to the flat surface of said first array body;

aligning a plurality of second bare fibers using said bare-fiber guide or another bare-fiber guide of the same structure;

bringing the flat surface of a second array body into contact with the second bare fibers aligned by means of the bare-fiber guide, tacking the second bare fibers onto the flat surface of said second array body by indirect bonding means while keeping the second bare fibers sandwiched between the bare-fiber guide and the flat surface of the second array body and while exposing the flat surface of the second array body from between the second bare fibers, and separating the second bare fibers and the bare-fiber guide thereafter;

forming a coating of uncured material on the external peripheral surfaces of the second bare fibers tacked onto the flat surface of said second array body and on the flat surface of the second array body exposed between the second bare fibers, curing this material, and bonding the second bare fibers to the flat surface of said second array body; and superposing said first array body and second array body through the agency of the uncured material such that the first bare fibers are disposed in central positions between the second bare fibers in the second array body and that the second bare fiber are disposed in central positions between the first bare fiber in the first array body, curing said material, and monolithically bonding the first array body and the second array body.

9. The method for manufacturing an optical fiber array according to claim 1, 3, 4 or 7, wherein said direct bonding means is a method selected from the group consisting of anode bonding, diffusion bonding and fusion bonding.

10. The method for manufacturing an optical fiber array according to claim 2, 5, 6 or 8, wherein said indirect bonding involves the use of a silica sol, low-melting glass, or a resin material curable by actinic radiation.

11. The method for manufacturing an optical fiber array according to claim 10, wherein a filler selected from the group consisting of glass fibers, glass powder, carbon fibers, and mineral powder is added to said resin material.

12. The method for manufacturing an optical fiber array according to claim 10, wherein roughening is performed on the flat surface of the array body or the flat member to which said bare fibers are tacked.

13. The method for manufacturing an optical fiber array according to claim 1, 2, 3, 4, 5, 6, 7 or 8, wherein the material for bonding the bare fibers to the flat surface of the array body or the flat member is a silica sol or a resin material curable by actinic radiation.

14. The method for manufacturing an optical fiber array according to claim 13, wherein a filler selected from the group consisting of glass fibers, glass powder, carbon fibers, and mineral powder is added to said resin material.

* * * * *